United States Patent [19]

Kushi et al.

[11] Patent Number: 5,538,334

[45] Date of Patent: Jul. 23, 1996

[54] VEHICLE ANTI-LOCK BRAKING SYSTEM WHEREIN OUTPUT END OF PUMP PASSAGE IS CONNECTED TO A PASSAGE CONNECTING REAR WHEEL BRAKE CYLINDER AND PROPORTIONING VALVE

[75] Inventors: Naoto Kushi, Toyota; Tatsuo Sugitani, Mishima; Kiyoyuki Uchida, Konan; Kenji Ito; Takashi Kondo, both of Toyota, all of Japan

[73] Assignee: Toyota Jidosha Kabushiki Kaisha, Toyota, Japan

[21] Appl. No.: 385,492

[22] Filed: Feb. 8, 1995

[30] Foreign Application Priority Data

Feb. 10, 1994 [JP] Japan ................................. 6-016835

[51] Int. Cl.$^6$ ................................. B60T 8/32; B60T 8/62
[52] U.S. Cl. .................. 303/113.5; 188/349; 303/115.4; 303/116.1; 303/119.1; 303/9.75
[58] Field of Search ............................. 303/113.5, 116.1, 303/119.1, 111, 9.62, 115.4, 9.75, 116.2, 113.1, 900, 901, 115.1, 115.5, 84.1, 84.2, 100; 188/349; 364/426.01, 426.02

[56] References Cited

U.S. PATENT DOCUMENTS

| | | | |
|---|---|---|---|
| 4,687,260 | 8/1987 | Matsui et al. | 303/116.1 |
| 4,875,741 | 10/1989 | Ozawa et al. | 303/111 |
| 4,943,123 | 7/1990 | Takeda et al. | 303/113.5 |
| 4,969,696 | 11/1990 | Yogo et al. | 303/116.1 |
| 4,989,924 | 2/1991 | Toda et al. | 303/116.1 |
| 5,021,957 | 6/1991 | Yoshino et al. | 303/113.5 |
| 5,143,428 | 9/1992 | Toda et al. | 303/113.5 |
| 5,178,442 | 1/1993 | Toda et al. | 303/113.5 |
| 5,271,667 | 12/1993 | Takata et al. | 303/113.2 |
| 5,302,007 | 4/1994 | Morita et al. | 303/113.5 |
| 5,320,423 | 6/1994 | Hashida | 303/113.5 |

FOREIGN PATENT DOCUMENTS

| | | |
|---|---|---|
| 62-131855A | 6/1987 | Japan . |
| 3169769A | 7/1991 | Japan . |

*Primary Examiner*—Douglas C. Butler
*Attorney, Agent, or Firm*—Kenyon & Kenyon

[57] ABSTRACT

A vehicle anti-lock braking system having X-crossed two pressure application sub-systems connected to respective independent chambers of a master cylinder, each sub-system including a normally-open first shut-off valve in a front brake cylinder passage between the master cylinder and a front wheel brake cylinder, a series connection of a normally-open second shut-off valve and a proportioning valve disposed in a portion of a rear brake cylinder passage connected to the front brake cylinder passage and a rear wheel brake cylinder, a normally-closed third shut-off valve in a reservoir passage connected to the rear brake cylinder passage and a reservoir, a pump in a pump passage which is connected at one end to the reservoir and the other end to a portion of the rear brake cylinder passage between the proportioning valve and the rear wheel brake cylinder, and a controller for controlling the three shut-off valves.

20 Claims, 11 Drawing Sheets

FIG. 3
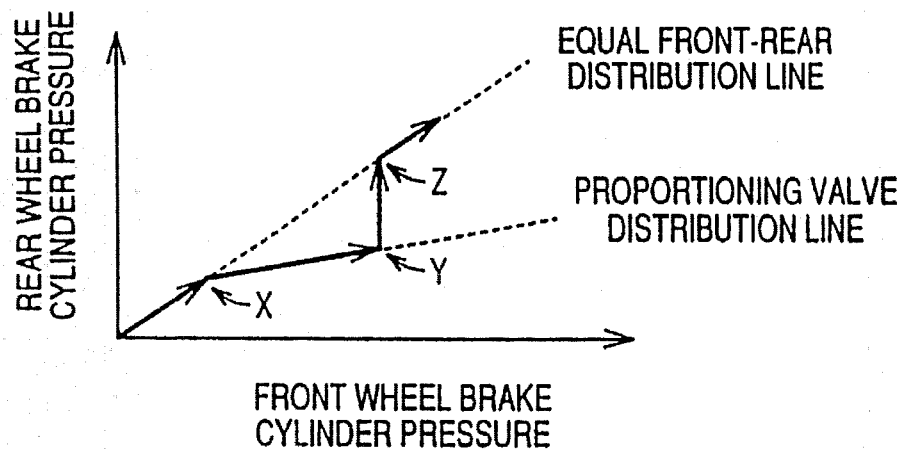
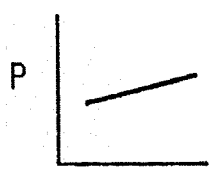
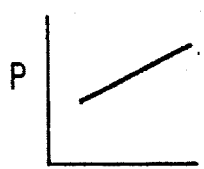
FIG.4A  FIG.4B
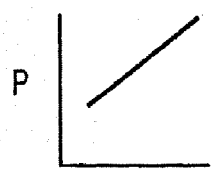
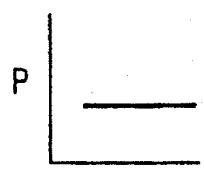
FIG.4C  FIG.4D

VEHICLE ANTI-LOCK BRAKING SYSTEM WHEREIN OUTPUT END OF PUMP PASSAGE IS CONNECTED TO A PASSAGE CONNECTING REAR WHEEL BRAKE CYLINDER AND PROPORTIONING VALVE

BACKGROUND OF THE INVENTION

1. Field of the Invention

The present invention relates in general to an anti-lock braking system of diagonal type equipped with a proportioning valve, and more particularly to technical improvements of such a braking system that assure increased freedom or flexibility of braking pressure control while minimizing the number of pressure control valves used in the system.

2. Discussion of the Related Art

An anti-lock braking system (hereinafter abbreviated as "ABS", where appropriate) is a braking system capable of controlling braking pressures for individual wheels of a motor vehicle so as to prevent locking of the wheels during brake application. One example of a known anti-lock braking system is proposed in JP-A-3-169769, which is capable of controlling the braking pressures with a high degree of control freedom with a relatively small number of pressure control valves.

This known ABS, which is used for a four-wheel motor vehicle, is constructed with two mutually independent pressure application sub-systems connected to respective two pressurizing chambers of a master cylinder. The two pressure application sub-systems are connected to two front wheel brake cylinders and two rear wheel brake cylinders, in a so-called "diagonal" or X-crossing manner such that one of the pressure application sub-systems is connected to the front left wheel brake cylinder and the rear right wheel brake cylinder while the other pressure application sub-system is connected to the front right wheel brake cylinder and the rear left wheel brake cylinder. Described more specifically by reference to FIG. 14, each of the pressure application sub-systems (only one of which is shown in FIG. 14) has a front brake cylinder passage 204 which connects the appropriate one of the pressurizing chambers of a master cylinder 200 and a front wheel brake cylinder 202, and further has a rear brake cylinder passage 206 which is connected to the front brake cylinder passage 204 and to a rear wheel brake cylinder 208. Each pressure application sub-system is further provided with a first shut-off valve 210, a second shut-off valve 212, a reservoir 214, a reservoir passage 216, a third shut-off valve 218, a pump 220 and a pump passage 222.

The first shut-off valve 210 is a normally open valve disposed in a portion of the front brake cylinder passage 204 between the master cylinder 200 and a point of connection of the front and rear brake cylinder passages 204, 206.

The second shut-off valve 212 is a normally open valve disposed in the rear brake cylinder passage 206.

The reservoir passage 216 is connected to a portion of the rear brake cylinder passage 206 between the second shut-off valve 212 and the rear wheel brake cylinder 208. The reservoir passage 216 is connected to the reservoir 214.

The third shut-off valve 218 is a normally closed valve disposed in the reservoir passage 216.

The pump 220 is adapted to pressurize a working fluid pumped up from the reservoir 214.

The pump passage 222 in which the pump 220 is provided is connected at one end to the reservoir 214, and at the other end to a portion of the front brake cylinder passage 204 between the first shut-off valve 210 and the master cylinder 200.

The known ABS described above has a controller, which is connected to the first, second and third shut-off valves 210, 212, 218 to control these shut-off valves for controlling the fluid pressures in the wheel brake cylinders 202, 208 in a selected one of a plurality of pressure control modes, so as to prevent locking of the vehicle wheels. The pressure control modes include at least: (1) a first mode in which the second and third shut-off valves 212, 218 are held open while the first shut-off valve 210 is held closed, to reduce both the front wheel brake cylinder pressure (pressure in the front wheel brake cylinder 202) and the rear wheel brake cylinder pressure (pressure in the rear wheel brake cylinder 208); and (2) a second mode in which the first and third shut-off valves 210, 218 are held open while the second shut-off valve 212 is held closed, to increase the front wheel brake cylinder pressure with the pressure in the master cylinder 200 and reduce the rear wheel brake cylinder pressure.

The known ABS of the type indicated above is capable of adequate anti-lock control of the wheel brake cylinder pressures during brake application on an even friction-coefficient road surface and an uneven friction-coefficient road surface. The even friction-coefficient road surface is interpreted to mean a road surface whose friction coefficient is almost uniform over its entire area on which the four wheels of the vehicle lie. The uneven friction-coefficient road surface is interpreted to mean a road surface whose friction coefficient is different at the local areas on which the left wheels and the right wheels lie.

That is, there is a situation of brake application during vehicle running on an uneven friction-coefficient road surface, in which the front wheel whose brake cylinder is controlled by one of the two pressure application sub-systems of the braking system lies on an area of the road surface having a relatively high friction coefficient while the rear wheel whose brake cylinder is controlled by the same pressure application sub-system lies on another area of the road surface having a relatively low friction coefficient. When the above situation occurs, it is desirable that the front wheel brake cylinder pressure be controlled to be higher than the rear wheel brake cylinder pressure, for maximizing the braking force of the front wheel to utilize as much as possible the relatively high friction coefficient of the corresponding road surface area, while minimizing the amount of reduction of the lateral force of the rear wheel tire to thereby increase the steering stability or directional stability of the vehicle. The known ABS described above is not only capable of controlling the brake cylinder pressures in the second mode for reducing only the rear wheel brake cylinder pressure without reducing the front wheel brake cylinder pressure, but also capable of increasing only the front wheel brake cylinder pressure without increasing the rear wheel brake cylinder pressure. Therefore, the known ABS is capable of applying brake to the vehicle with a reduced braking distance without a loss of control of the running direction, even when the brake application takes place on the uneven friction-coefficient road surface.

If the braking system has a pressure increasing valve and a pressure reducing valve for each of the four wheels, the brake cylinder pressures of the four wheels can be regulated independently of each other. In this case, however, the braking system requires a total of as many as eight pressure control valves, two valves for each of the four wheels. The known ABS explained above uses a total of six pressure control valves, namely, three shut-off valves for each of the two pressure application sub-systems, which permit a higher degree of control freedom or flexibility of the braking pressures than in a braking system in which the braking pressures for all the four wheels are controlled in the same manner, although it is impossible to control the braking pressures of the two wheels in each pressure application sub-system completely independently of each other. Thus, the known ABS assures a relatively high degree of control freedom of the braking pressure with a relatively small number of pressure control valves.

However, further experiment and research made by the assignee of the present invention revealed the following problem with the known ABS described above.

The known ABS is a fluid recirculating type in which the brake fluid discharged from the wheel brake cylinders into the reservoir is returned by the pump to the master cylinder or a suitable fluid passage or other portion of the braking system in which the pressure is kept equal to the master cylinder pressure. In this fluid recirculating type braking system, the fluid pressure generated by the pump must be higher than the master cylinder pressure for the fluid to be returned from the reservoir toward the master cylinder. As a result, the pressurized fluid delivered from the pump tends to have a relatively large pressure pulsation, which is undesirably transmitted to the vehicle operator's foot through the brake pedal, as well known in the art as "kickback phenomenon". The pressure pulsation also causes a problem of the vehicle body vibration due to vibration of components of the braking system, and a problem that the mechanism including the pump and a motor for driving the pump and used for returning the fluid from the reservoir toward the master cylinder must have a large capacity, which makes it difficult to fulfill a need of reducing the size, weight and cost of manufacture of the braking system.

In the light of the above problems of the conventional ABS shown in FIG. 14, the assignee of the present invention developed improved anti-lock braking systems as shown in FIGS. 15 and 16, which are arranged to reduce the pressure pulsation of the brake fluid and incorporate a proportioning valve.

In the improved ABS of FIG. 15, the pump passage 222 is connected at its delivery output end to a portion of the front brake cylinder passage 204 between the first shut-off valve 210 and the front wheel brake cylinder 202. In this arrangement, therefore, the fluid pressurized by the pump 220 can be returned to the front brake cylinder passage 204 when the pressure of the fluid in the pump passage 222 is higher than the pressure in the front wheel brake cylinder 202, which is not always equal to the pressure in the master cylinder 200. Thus, the present arrangement permits easy reduction of the pressure pulsation upon fluid recirculation from the pump 220 to the front brake cylinder passage 204.

In the ABS of FIG. 15, a proportioning valve 230 is connected to a portion of the rear brake cylinder passage 206 between the rear wheel brake cylinder 208 and a point of connection of the passage 206 to the reservoir passage 216.

The ABS of FIG. 15 has a plurality of pressure control modes which include at least: (1) a first mode in which the second and third shut-off valves 212, 218 are held open while the first shut-off valve 210 is held closed, to reduce both the front wheel brake cylinder pressure and the rear wheel brake cylinder pressure; and (2) a second mode in which the first and second shut-off valves 210, 212 are held closed while the third shut-off valve 218 is held open, to increase the front wheel brake cylinder pressure by operation of the pump 220 and reduce the rear wheel brake cylinder pressure.

Consequently, the ABS of FIG. 15 is also capable of controlling the brake cylinder pressures in the second mode for reducing the rear wheel brake cylinder pressure without reducing the front wheel brake cylinder pressure, and increasing the front wheel brake cylinder pressure without increasing the rear wheel brake cylinder pressure. Thus, this braking system permits adequate anti-lock control of the brake cylinder pressures on not only the even friction-coefficient road surface but also the uneven friction-coefficient road surface.

On the other hand, the improved ABS of FIG. 16 differs from the ABS of FIG. 15 in that the pump passage 222 of the former ABS is connected at its output end to a portion of the rear brake cylinder passage 206 between the second shut-off valve 212 and the proportioning valve 230. In the other aspects, the ABS of FIG. 16 is identical with the ABS of FIG. 15. Namely, the arrangements of FIGS. 15 and 16 have a common design concept that the delivery or output end of the pump passage 222 is located downstream of the first shut-off valve 210. Therefore, the improved ABS of FIG. 16 also permits easy reduction of the pressure pulsation associated with the fluid recirculation by the pump 220.

It will be understood from the above explanation that both of the improved ABS arrangements of FIGS. 15 and 16 are adapted to reduce the required delivery pressure of the pump 220 for thereby reducing the fluid pressure pulsation by the pump 220. However, a further study by the present inventors found out some problems with these improved ABS arrangements as described below.

In the arrangements of FIGS. 15 and 16, the brake fluid delivered by the pump 220 is returned to a portion of the braking system which is upstream of the proportioning valve 230 as viewed in the direction from the master cylinder 200 toward the wheel brake cylinders 202, 208. Hence, the pressure in the rear wheel brake cylinder 208 located on the downstream side of the proportioning valve 230 is influenced by a pressure reducing effect of the proportioning valve 230 even while the braking system is in the anti-lock control mode, whereby the rear brake cylinder pressure cannot be made sufficiently high. Thus, the improved arrangements suffer from a problem that the friction coefficient of the road surface cannot be sufficiently utilized by the rear wheel to effectively brake the vehicle.

Generally, a proportioning valve is provided to establish an ideal or optimum distribution of the total braking force on the front wheels and the rear wheels of the vehicle. To determine the ideal braking force distribution, a shifting of the vehicle load in the vehicle running direction upon braking is taken into account. That is, when the vehicle is running forward, the load acting on the front wheels increases while that acting on the rear wheels decreases. A line A (hereinafter referred to "ideal distribution line") in FIG. 2 represents the ideal distribution of the braking force on the front and rear wheels, which is determined by the characteristics of the proportioning valve. The ideal distribution line can or cannot be changed or adjusted depending upon the type of the proportioning valve. Where the ideal distribution line cannot be changed, this line is determined to achieve ideal distribution of the braking force during a vehicle run with a minimum load (hereinafter referred to as "minimum-load vehicle run"), namely, when the vehicle is running with only the driver. During the minimum-load vehicle run, the amount of reduction of the load acting on the rear wheels due to the load shift upon brake application is maximum. If the ideal distribution line of the proportioning valve is determined for ideal braking force distribution during the minimum-load vehicle run, the rear wheels cannot be effectively utilized for effective braking of the vehicle during a vehicle run with a maximum or full-load (hereinafter referred to as "full-load vehicle run"), namely, when the vehicle is running with the nominal number of passengers (including the driver). During the full-load vehicle run, the amount of reduction of the load acting on the rear wheels is smaller than that during the minimum-load vehicle run, if the vehicle deceleration by brake application is the same. This means that a larger braking force can be applied to the rear wheels without locking in the case of the full-load vehicle run than in the case of the minimum-load vehicle run. See lines C and D in FIG. 2. However, the proportioning valve designed to establish the ideal braking force distribution in the case of the minimum-load vehicle run cannot increase the rear wheel brake cylinder pressures for effective utilization of the rear wheels for effective vehicle braking in the case of the full-load vehicle run, while the rear wheel brake cylinder pressures can be increased without locking of the rear wheels during the full-load vehicle run.

SUMMARY OF THE INVENTION

It is therefore a principal object of the present invention to provide an anti-lock braking system which solves the problem encountered in the arrangements of FIGS. 15 and 16, and which assure improved freedom or flexibility of braking pressure control while minimizing the number of pressure control valves used in the system.

It is a first optional object of this invention to solve the above problem by connecting the output end of the pump passage to a pressure portion of the braking system located downstream of the first shut-off valve and the proportioning valve and upstream of the second shut-off valve, and at the same time make it possible to increase only the front wheel brake cylinder pressure by operation of the pump.

A second optional object of the invention is to further improve the freedom of control of the braking pressures by alternately turning on and off the second shut-off valve.

A third optional object of the invention is to further improve the freedom of control of the braking pressures by changing the duty cycle of the second shut-off valve.

A fourth optional object of the invention is to achieve optimum control of the duty cycle of the second shut-off valve by taking into account the braking pressure reduction characteristic during an anti-lock control of the braking pressures.

A fifth optional object of the invention is to achieve optimum control of the duty cycle of the second shut-off valve by taking into account changes in the loads acting on the vehicle wheels due to a load shift in the running direction of the vehicle upon brake application.

A sixth optional object of the invention is to achieve optimum control of the duty cycle of the second shut-off valve by taking into account changes in the wheel loads due to a load shift in the lateral direction of the vehicle.

The principal object indicated above may be achieved according to one aspect of the present invention, which provides an anti-lock braking system of a diagonal or X-crossing type for a four-wheel motor vehicle, having two pressure application sub-systems which are connected to respective two mutually independent pressurizing chambers of a master cylinder, each of the two pressure application sub-system including (a) a front brake cylinder passage connecting a corresponding one of the two pressurizing chambers of the master cylinder and a front wheel brake cylinder, (b) a rear brake cylinder passage connecting the front brake cylinder passage and a rear wheel brake cylinder, (c) a normally-open, first solenoid-operated shut-off valve disposed in a portion of the front brake cylinder passage between the master cylinder and a point of connection of the front and rear brake cylinder passages, (d) a series connection of a normally-open, second solenoid-operated shut-off valve and a proportioning valve disposed in the rear brake cylinder passage, (e) a reservoir passage connected at one of opposite ends thereof to a portion of the rear brake cylinder passage between the second solenoid-operated shut-off valve and the rear wheel brake cylinder, (f) a reservoir connected to the other end of the reservoir passage, (g) a normally-closed, third solenoid-operated shut-off valve disposed in the reservoir passage, (h) a pump passage connected at one of opposite ends thereof to the reservoir and at the other end to at least one of the front and rear brake cylinder passages, (i) a pump disposed in the pump passage for delivering a working fluid from the reservoir to a portion of the each pressure application sub-system, and (j) a controller for controlling the first, second and third solenoid-operated shut-off valves to effect an anti-lock pressure control operation for controlling pressures of the working fluid in the front and rear wheel brake cylinders in an anti-lock manner, wherein the pump passage is connected at the above-indicated other end to a portion of the rear brake cylinder passage which is between the proportioning valve and the rear wheel brake cylinder.

In the anti-lock braking system of the present invention constructed as described above, the output end (other end indicated above) of the pump passage is connected to a portion of each pressure application sub-system which is downstream of the first solenoid-operated shut-off valve, namely, on one of opposite sides of the first shut-off valve which is remote from the master cylinder. In the anti-lock pressure control operation, the pressure at the portion of the sub-system downstream of the first shut-off valve tends to be lower than the pressure in the master cylinder. Therefore, the required delivery pressure of the pump is lower in the present arrangement than in the arrangement in which the output end of the pump passage is connected directly to the master cylinder, whereby the pressure pulsation of the pressurized fluid delivered from the pump is reduced.

The present braking system may be adapted such that the first shut-off valve is held closed in principle during the anti-lock pressure control operation. In this case, the pump passage is disconnected from the master cylinder by the closed first shut-off valve during the anti-lock pressure control operation, and there is an increased tendency that the pressure at the output end of the pump passage is lowered with respect to the master cylinder pressure. Consequently, the pressure pulsation if caused by the pump is isolated by the first shut-off valve from the master cylinder, whereby an otherwise possible kickback to the vehicle driver through the brake pedal and consequent vibration of the vehicle body are substantially entirely avoided.

Further, the present braking system makes it possible to minimize the size, weight and cost of manufacture of a fluid recirculating mechanism including the pump and a pump motor for recirculating the fluid, and a fluid-actuated damper for absorbing pressure pulsation of the fluid delivered by the pump, or a mechanical damper for preventing or minimizing the transmission of vibrations from a brake unit (incorporating the pump, motor, shut-off valves, etc.) to the vehicle body.

In each pressure application sub-system of the present braking system, the output end of the pump passage is located downstream of the proportioning valve, that is, connected to a portion of the rear brake cylinder passage which is between the proportioning valve and the rear wheel brake cylinder. According to this arrangement, the working fluid (brake fluid) delivered from the pump can be supplied to the rear wheel brake cylinder without passing the proportioning valve, so that the pressure in the rear wheel brake cylinder can be increased without an influence of a pressure reducing effect of the proportioning valve.

Since the pressure in the rear wheel brake cylinder is not influenced by the proportioning valve, the rear wheel brake cylinder can produce a sufficiently large braking force, which results in reducing the required braking distance of the vehicle.

One preferred form of the present braking system is illustrated in FIG. 12, in which proportioning valve 230 and second solenoid-operated shut-off valve 212 are disposed in this order in the direction from master cylinder 200 toward rear wheel brake cylinder 208, and the output end of pump passage 222 is located downstream of the proportioning valve 230 and also downstream of the second shut-off valve 212. In another preferred form of the braking system illustrated in FIG. 13, the second shut-off valve 212 and the proportioning valve 230 are disposed in this order such that the proportioning valve 230 is disposed between the second shut-off valve 212 and the rear wheel brake cylinder 208. In this form, too, the output end of the pump passage 222 is located downstream of the second shut-off valve 212 and proportioning valve 230. Since the fluid is delivered from the pump to a portion of the rear brake cylinder passage 206 which is downstream of the proportioning valve 230 in these two forms of the braking system, the pressure in the rear wheel brake cylinder 208 can be increased without an influence of the proportioning valve 230.

However, the braking systems of FIGS. 12 and 13 are not capable of increasing only the pressure in the front wheel brake cylinder 202 by operation of the pump 220, because the output end of the pump passage 222 is held in communication with the rear wheel brake cylinder 208.

The above problem may be solved and the first optional object indicated above may be achieved, according to a further preferred form of the present invention as illustrated in FIG. 11, in which the proportioning valve 230 and the second shut-off valve 212 are disposed in this order in the direction from the master cylinder 200 toward the rear wheel brake cylinder 208. In other words, the proportioning valve 230 is disposed between the point of connection of the front and rear brake cylinder passages 204, 206 and the second shut-off valve 212 while the second shut-off valve is disposed between the proportioning valve and the rear wheel brake cylinder 208. Further, the output end of the pump passage 222 is located downstream of the proportioning valve 230 and upstream of the second shut-off valve 212, namely, connected to a portion of the rear brake cylinder passage 206 between the proportioning valve 230 and the second shut-off valve 212. In this arrangement, the output end of the pump passage 222 is held in communication with the front wheel brake cylinder 202 through the proportioning valve 230, and is connected to the rear wheel brake cylinder 208 that can be closed to disconnect the pump passage from the rear wheel brake cylinder 208.

In the above form of the invention of FIG. 11, the fluid delivered from the pump 220 is supplied through the proportioning valve 230 to the front wheel brake cylinder 202 but is not supplied to the rear wheel brake cylinder 208 when the first and second shut-off valves 210, 212 are both closed. Thus, only the pressure in the front wheel brake cylinder 202 can be increased without an increase in the rear wheel brake cylinder 208, by closing both of the first and second shut-off valves 210, 212. This arrangement permits both the maximization of the braking force of the front wheel and the maximization of the cornering force of the rear wheel, for minimizing the required braking distance of the vehicle and maximizing the steering or directional stability of the vehicle, during running of the vehicle on an uneven friction-coefficient road surface such that the front wheel lies on an area of the road surface having a relatively high friction coefficient while the rear wheel lies on another area of the road surface having a relatively low friction coefficient.

The present anti-lock braking system may be adapted to operate in a selected one of the following seven pressure control modes for controlling the pressures in the front and rear wheel brake cylinders. TABLE 1 below indicates a relationship between these seven pressure control modes and respective combinations of open/closed states of the first, second and third solenoid-operated valves.

TABLE 1

| Mode | States of Shut-Off Valves | | | Pressure Control States of Front and Rear Brake Cylinders | |
|---|---|---|---|---|---|
| | 1 | 2 | 3 | Front | Rear |
| 1 | O | O | C | M/C Increase | M/C Increase |
| 2 | O | C | C | M/C Increase | Hold |
| 3 | O | C | O | M/C Increase | Reduction |
| 4 | C | O | C | Pump Increase | Pump Increase |
| 5 | C | C | C | Pump Increase | Hold |
| 6 | C | C | O | Pump Increase | Reduction |
| 7 | C | O | O | Reduction | Reduction |

O: Valve Open
C: Valve Closed
M/C Increase: Pressure increase by the master cylinder
Pump Increase: Pressure increase by the pump When the first shut-off valve 210 is open (in the first, second and third modes), the fluid delivered from the pump 220 in operation may be supplied to the front wheel brake cylinder 202 through the proportioning valve 230 and also to the rear wheel brake cylinder 208, or to only the front wheel brake cylinder 202. However, the pressure of the fluid delivered from the pump 220 is usually lower than the pressure produced by the master cylinder 200 while the pump 220 and the master cylinder 200 are held in communication with each other through the first shut-off valve 210 placed in the open state. In the first, second and third pressure control modes in which the first shut-off valve 210 is open as indicated in TABLE 1, the pressure in the front and rear wheel brake cylinders 202, 208 or the pressure in the front wheel brake cylinder 202 is increased by the pressure in the master cylinder 200. This increase is indicated as "M/C Increase" in TABLE 1.

The second optional object indicated above may be achieved according to one advantageous arrangement of the above form of the invention illustrated in FIG. 11, in which the controller has a plurality of operation modes which are selectively established to control the first, second and third solenoid-operated shut-off valves in the anti-lock manner and which include (i) a mode in which the second and third solenoid-operated shut-off valves are both open while the first solenoid-operated shut-off valve is closed, to reduce the pressures in both of the front and rear wheel brake cylinders, (ii) a mode in which the first and second solenoid-operated shut-off valves are both closed while the third solenoid-operated shut-off valve is open, to increase the pressure in the front wheel brake cylinder by operation of the pump and reduce the pressure in the rear wheel brake cylinder, and (iii) a duty-cycle pressure control mode in which the first and third solenoid-operated shut-off valves are both closed while the second solenoid-operated shut-off valve is alternately closed and opened.

In the above advantageous arrangement, the controller has the duty-cycle pressure control mode in which the second shut-off valve is alternately closed and opened to increase the pressure in the front and rear wheel brake cylinders. In the anti-lock pressure control operation, the fluid delivered from the pump is supplied to only the front wheel brake cylinder when the second shut-off valve is closed, and is supplied to both of the front and rear wheel brake cylinders when the second shut-off valve is open. Therefore, the pressure in the front and rear wheel brake cylinders can be increased at respective rates determined by the duty cycle of the solenoid of the second shut-off valve. Thus, the duty-cycle pressure control mode increases the freedom or flexibility of control of the braking pressures applied to the front and rear wheel brake cylinders.

The third optional object indicated above may be achieved if the controller comprises means for changing the duty cycle of the solenoid of the second solenoid-operated shut-off valve to thereby change the rates at which the pressures in the front and rear wheel brake cylinders are increased in the duty-cycle pressure control mode. In this instance, the second shut-off valve is used for not only merely increasing, holding or reducing the brake cylinder pressures, but also controlling the rates at which the pressures in the front and rear wheel brake cylinders are increased. Although the duty cycle of the second shut-off valve may be held constant, it is advantageous to change the duty cycle depending upon the braking condition of the vehicle, so that the freedom of control of the braking pressures is further improved, for improved performance of the braking system. In this case, pulses for effecting the energization or de-energization of the solenoid of the second shut-off valve may be generated with a predetermined cycle time.

The rates of increase of the brake cylinder pressures may be changed by some mechanical means, for instance, flow restrictors which are disposed in the front and rear brake cylinder passages and whose cross sectional areas of fluid flow are variable. In the advantageous arrangement, such mechanical means is replaced by the means for changing the duty cycle of the second shut-off valve as described above, which means is constituted by a control program or electronic circuitry provided in the controller. This arrangement permits controlled rates of increase of the brake cylinder pressures while avoiding an increase in the cost of the braking system.

Generally, individual vehicles have different optimum increase rates of the wheel brake cylinder pressures that assure adequate anti-lock control of the braking forces of the wheels in relation to the specific characteristics of the braking system such as the ratio of the diameters of the front and rear wheel brake cylinders, and in relation to the specific braking conditions of the vehicle such as the actual braking effect and load distribution of the vehicle on the front and rear wheels. In the above advantageous arrangement, the rates of pressure increase of the front and rear wheel brake cylinders can be easily controlled without a costly mechanism, such that the duty cycle of the second shut-off valve is controlled by the controller, so as to meet the specific characteristics of the braking system of the particular vehicle.

The fourth optional object indicated above may be achieved if the means for changing the duty cycle changes the duty cycle of the solenoid of the second solenoid-operated shut-off valve on the basis of at least one of pressure reducing tendency of the front wheel brake cylinder and pressure reducing tendency of the rear wheel brake cylinder, which tendencies have been exhibited in the anti-lock pressure control operation. For example, the pressure reducing tendencies or hystereses are expressed by the numbers or frequencies of pressure reductions which have been effected with the front and rear wheel brake cylinders, the pressure reducing times of these cylinders, or the rates at which the pressures have been reduced.

Such previous and present pressure reducing tendencies reflect directly the locking tendencies of the front and rear wheels. Accordingly, the locking tendencies of the wheels can be detected by monitoring the pressure reducing tendencies during the anti-lock pressure control operation. If the pressure in the rear wheel brake cylinder has been reduced more frequently than that in the front wheel brake cylinder, it is possible to determine that the rear wheel has a higher locking tendency than the front wheel. In this case, it is desirable to reduce the rear brake cylinder pressure and increase the front brake cylinder pressure. In other words, it is desirable to determine the duty cycle of the solenoid of the second shut-off valve, so as to establish a distribution of the pressures of the front and rear wheel brake cylinders which causes a higher rate of increase in the pressure of the front wheel brake cylinder and a lower rate of increase in the rear wheel brake cylinder when the rear wheel brake cylinder has exhibited a higher tendency of pressure reduction than the front wheel brake cylinder.

In the above arrangement wherein the duty cycle of the second shut-off valve is changed or controlled depending upon the pressure reducing tendency or tendencies of the front and/or rear wheel brake cylinders, the second shut-off valve is alternately opened and closed with the duty cycle which reflects the previous locking tendency or tendencies of the front and/or rear wheels, which is/are reflected by the pressure reducing tendency or tendencies of the brake cylinder or cylinders. The locking tendencies of the wheels are resultant from various factors such as the friction coefficients of the road surface areas on which the wheels lie, wheel braking torques and loads acting on the wheels. Therefore, the rates of increase of the brake cylinder pressures which are determined by the thus controlled duty cycle of the second shut-off valve can be adequately controlled with high precision so as to reflect the actual braking or locking tendencies of the wheels.

The pressure reducing tendencies of the front and rear wheel brake cylinders can be detected by monitoring the signals generated to energize or de-energize the solenoids of the first, second and third shut-off valves. Thus, the above arrangement does not require an exclusive sensor for detecting the pressure reducing hystereses of the wheel brake cylinders, and is therefore available at a relatively low cost while it is capable of adequately controlling the duty cycle, namely, the pressure increase rates of the wheel brake cylinders.

The fifth optional object indicated above can be achieved according to a further preferred arrangement of the invention, wherein the means for changing the duty cycle changes the duty cycle of the solenoid of the second solenoid-operated shut-off valve on the basis of an amount of shift of a load on the motor vehicle in a running direction of the vehicle.

Upon braking of the vehicle, the load acting on the front wheels increases while the load acting on the rear wheels decrease, due to a shift of the vehicle load in the vehicle running direction. This means that the front wheel brake cylinder pressure should be increased to increase the braking force on the front wheel while the rear wheel brake cylinder pressure should be reduced to prevent the rear wheel from locking. To this end, it is preferable to determine the duty cycle of the solenoid of the second solenoid-operated shut-off valve, so as to establish a distribution of the pressures of the front and rear wheel brake cylinders which causes a higher rate of increase in the pressure of the front wheel brake cylinder and a lower rate of increase in the rear wheel brake cylinder when the amount of shift of the load to a front wheel for which the front wheel brake cylinder is provided is relatively large than when the amount of shift of the load to the front wheel is relatively small.

The sixth optional object indicated above can be achieved according to another preferred arrangement of the invention, wherein the means for changing the duty cycle changes the duty cycle of the solenoid of the second solenoid-operated shut-off valve on the basis of an amount of shift of a load on the vehicle in a lateral direction of the vehicle.

In the pressure application sub-system in which the front and rear wheels to be braked by the front and rear wheel brake cylinders are respectively located on the outer and inner sides of the vehicle turning line along which the vehicle is turning, the load acting on the front wheel increases while the load acting on the rear wheel decreases, due to a shift of the vehicle load in the lateral direction perpendicular to the running direction. In this case, too, it is desired to increase the front wheel brake cylinder pressure to increase the braking force on the front wheel and decrease the rear wheel brake cylinder pressure to prevent the locking of the rear wheel. In this respect, it is preferable to determine the duty cycle of the solenoid of the second solenoid-operated shut-off valve, so as to establish a distribution of the pressures of the front and rear wheel brake cylinders which causes a higher rate of increase in the pressure in the front wheel brake cylinder and a lower rate of increase in the rear wheel brake cylinder when the amount of shift of the load is relatively large than when the amount of shift of the load is relatively small, in the pressure application sub-system in which the front and rear wheel brake cylinders are respectively located on the outer and inner sides of the vehicle turning line.

In the above two preferred arrangements in which the duty cycle is changed on the basis of the vehicle load shifts in the running and lateral directions, the increase rates of the front and rear wheel brake cylinders can be adequately determined so as to maximize the present braking capacities of the front and rear wheels, while taking into account the amounts of change in the loads acting on the front and rear wheels, due to the vehicle load shifts in the running and lateral directions of the vehicle.

The loads acting on the wheels are physical values which influence the locking tendencies of the wheels. Therefore, the future locking tendencies of the wheels can be estimated depending upon the vehicle load shifts, so that the duty cycle of the second shut-off valve is determined based on the estimated wheel locking tendencies, so as to follow the wheel locking tendencies with high response.

The duty cycle of the second shut-off valve may be changed or determined on the basis of other physical values or parameters such as the friction coefficient of the road surface, operating force acting on the brake pedal, and relationship between the friction coefficients of the road surface areas on which the front and rear wheels lie. It is also possible to provide suitable means for permitting the vehicle driver to change the duty cycle as needed.

The principal object indicated above may also be achieved according to a second aspect of the present invention, which provides an anti-lock braking system of a diagonal or X-crossing type for a four-wheel motor vehicle, having two pressure application sub-systems which are connected to respective two mutually independent pressurizing chambers of a master cylinder, each of the two pressure application sub-system including (a) a front brake cylinder passage connecting a corresponding one of the two pressurizing chambers of the master cylinder and a front wheel brake cylinder, (b) a rear brake cylinder passage connecting the front brake cylinder passage and a rear wheel brake cylinder, (c) a normally-open, first solenoid-operated shut-off valve disposed in a portion of the front brake cylinder passage between the master cylinder and a point of connection of the front and rear brake cylinder passages, (d) a series connection of a normally-open, second solenoid-operated shut-off valve and a proportioning valve disposed in the rear brake cylinder passage, (e) a reservoir passage connected at one of opposite ends thereof to a portion of the rear brake cylinder passage between the second solenoid-operated shut-off valve and the rear wheel brake cylinder, (f) a reservoir connected to the other end of the reservoir passage, (g) a normally-closed, third solenoid-operated shut-off valve disposed in the reservoir passage, (h) a pump passage connected at one of opposite ends thereof to the reservoir and at the other end to at least one of the front and rear brake cylinder passages, (i) a pump disposed in the pump passage for delivering a working fluid from the reservoir to a portion of the each pressure application sub-system, and (j) a controller for controlling the first, second and third solenoid-operated shut-off valves to effect an anti-lock pressure control operation for controlling pressures of the working fluid in the front and rear wheel brake cylinders in an anti-lock manner, wherein the above-indicated other end of the pump passage is connected to at least one of the rear brake cylinder passage and a portion of the front brake cylinder passage between the first solenoid-operated shut-off valve and the front wheel brake cylinder, and the controller has a plurality of operation modes which are selectively established to control the first, second and third solenoid-operated shut-off valves in the anti-lock manner, the plurality of operation modes including (1) a mode in which the second and third solenoid-operated shut-off valves are both open while the first solenoid-operated shut-off valve is closed, to reduce the pressures in both of the front and rear wheel brake cylinders, (2) a mode in which the first and second solenoid-operated shut-off valves are both closed while the third solenoid-operated shut-off valve is open, to increase the pressure in the front wheel brake cylinder by operation of the pump and reduce the pressure in the rear wheel brake cylinder, and (3) a duty-cycle pressure control mode in which the first and third solenoid-operated shut-off valves are both closed while the second solenoid-operated shut-off valve is alternately closed and opened.

The braking system which has the duty-cycle pressure control mode as described above assures improved freedom of control of the pressures in the front and rear wheel brake cylinders, by alternately closing and opening the second shut-off valve.

The principal object indicated above may also be achieved according to a third aspect of this invention, which provides an anti-lock braking system of a diagonal or X-crossing type for a four-wheel motor vehicle, having two pressure application sub-systems which are connected to respective two mutually independent pressurizing chambers of a master cylinder, each of the two pressure application sub-system including (a) a front brake cylinder passage connecting a corresponding one of the two pressurizing chambers of the master cylinder and a front wheel brake cylinder, (b) a rear brake cylinder passage connecting the front brake cylinder passage and a rear wheel brake cylinder, (c) a normally-open, first solenoid-operated shut-off valve disposed in a portion of the front brake cylinder passage between the master cylinder and a point of connection of the front and rear brake cylinder passages, (d) a series connection of a normally-open, second solenoid-operated shut-off valve and a proportioning valve disposed in the rear brake cylinder passage, (e) a reservoir passage connected at one of opposite ends thereof to a portion of the rear brake cylinder passage between the second solenoid-operated shut-off valve and the rear wheel brake cylinder, (f) a reservoir connected to the other end of the reservoir passage, (g) a normally-closed, third solenoid-operated shut-off valve disposed in the reservoir passage, (h) a pump passage connected at one of opposite ends thereof to the reservoir and at the other end to at least one of the front and rear rear brake cylinder passages, (i) a pump disposed in the pump passage for delivering a working fluid from the reservoir to a portion of the each pressure application sub-system, and (j) a controller for controlling the first, second and third solenoid-operated shut-off valves to effect an anti-lock pressure control operation for controlling pressures of the working fluid in the front and rear wheel brake cylinders in an anti-lock manner, wherein the above-indicated other end of the pump passage is connected to at least one of the rear brake cylinder passage and a portion of the front brake cylinder passage between the first solenoid-operated shut-off valve and the front wheel brake cylinder, and the controller comprises means for inhibiting an operation of the pump when it is required to increase a rate of reduction of the pressure in the front wheel brake cylinder during the anti-lock pressure control operation.

The present braking system wherein the controller is adapted to inhibit the operation of the pump as needed also assures improved freedom of control of the wheel brake cylinder pressures.

BRIEF DESCRIPTION OF THE DRAWINGS

The above and optional objects, features and advantages of the present invention will be better understood by reading the following detailed description of presently preferred embodiments of the invention, when considered in connection with the accompanying drawings, in which:

FIG. 3 is a graph indicating a relationship between the front and rear wheel brake cylinder pressures as controlled by a proportioning valve used in the braking system of FIG. 1;

FIG. 4 is a graph for explaining changes in the front and rear wheel brake cylinder pressures as controlled differently in an anti-lock fashion in fourth and fifth modes of operation of the braking system;

DETAILED DESCRIPTION OF THE PREFERRED EMBODIMENTS

Figure 1:
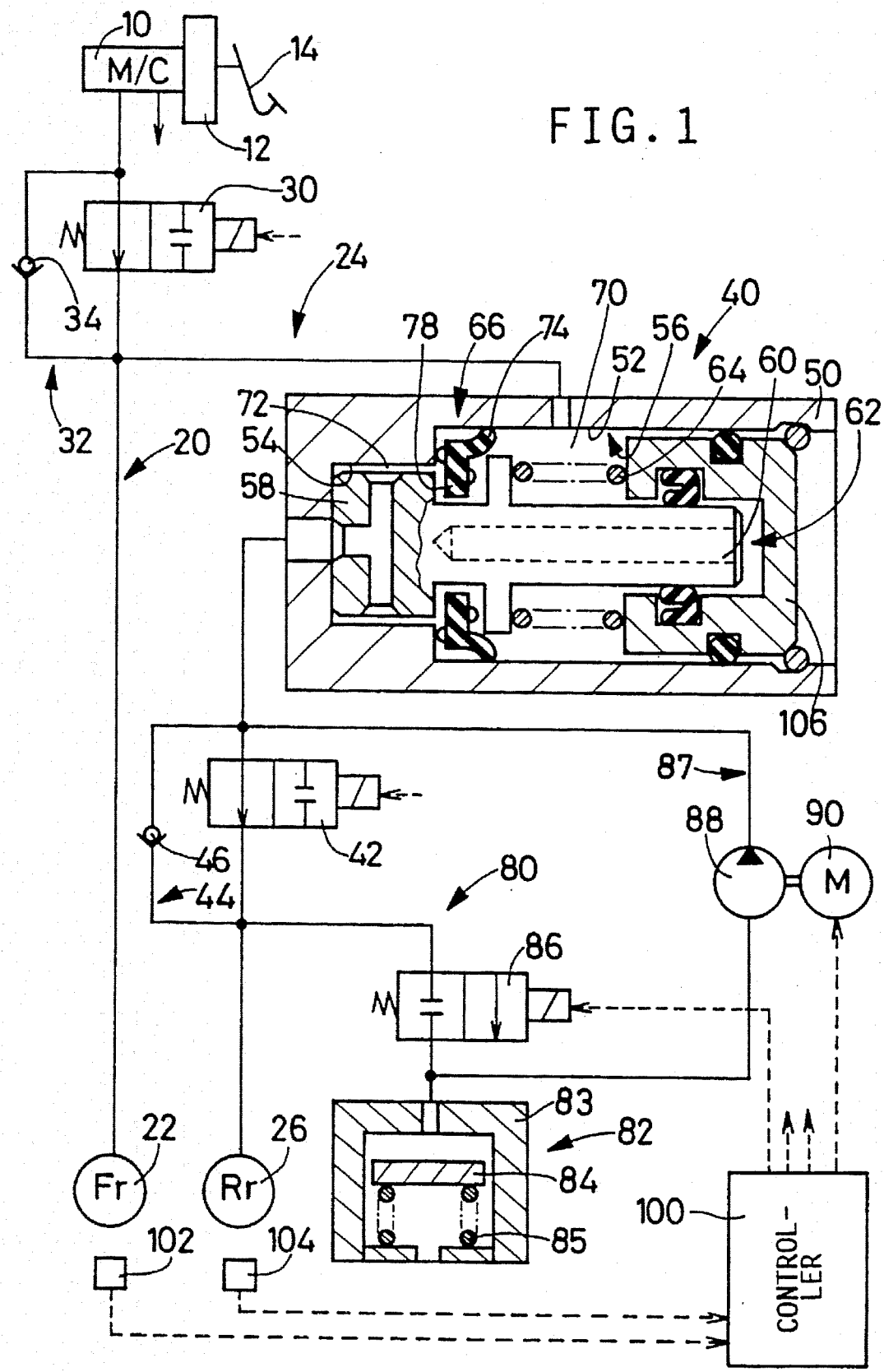
FIG. 1 is a schematic view of one embodiment of an anti-lock braking system of the present invention.

Referring first to FIG. 1, there is shown an anti-lock braking system of the diagonal or X-crossing type for a motor vehicle. The present braking system is provided with a master cylinder 10 of tandem type in which two mutually independent fluid pressurizing chambers are disposed in series. The master cylinder 10 is linked with a brake operating member in the form of a brake pedal 14 through a booster 12. Upon operation of the brake pedal 14 by the driver or operator of the motor vehicle, equal fluid pressures are generated in the two pressurizing chambers of the master cylinder 10, such that the generated fluid pressures vary with an operating force which acts on the brake pedal 14.

One of the pressurizing chambers of the master cylinder 10 is connected to a brake cylinder of a front left wheel and a brake cylinder of a rear right wheel of the vehicle, while the other pressurizing chamber is connected to brake cylinders of a front right wheel and a rear left wheel of the vehicle. The braking system has two mutually independent pressure application sub-systems. In the first pressure application sub-system, one of the pressurizing chambers of the master cylinder 10 functions as a pressure source, and the fluid pressures in the brake cylinders of the front left and rear right wheels are controlled. In the second pressure application sub-system, the other pressurizing chamber functions as a pressure source, and the fluid pressures in the brake cylinders of the front right and rear left wheels are controlled. Since the first and second pressure application sub-systems are identical in construction, only one of these sub-systems is illustrated in FIG. 1 and will be described hereinafter.

In each pressure application sub-system, the corresponding pressurizing chamber of the master cylinder 10 is connected to a front wheel brake cylinder 22 through a front brake cylinder passage 20. A rear brake cylinder passage 24 is connected at one end thereof to the front brake cylinder passage 20 and at the other end to a rear wheel brake cylinder 26.

In a portion of the front brake cylinder passage 20 between the master cylinder 10 and a point of connection to the rear brake cylinder passage 24, there is disposed a normally-open first solenoid-operated shut-off valve 30. That is, the first shut-off valve 30 is located upstream of the point of connection between the front and rear brake cylinder passages 20, 24. To the front brake cylinder passage 20, there is also connected a by-pass passage 32 which by-passes the first shut-off valve 30. The by-pass passage 32 incorporates a check valve 34, which inhibits a flow of the brake fluid in the direction from the master cylinder toward the front wheel brake cylinder 22 and permits a flow of the fluid in the opposite direction. The check valve 34 is opened to permit the flow when the pressure on its downstream side is higher than the pressure on its upstream side by an almost negligibly small amount.

In the rear brake cylinder passage 24, there are provided a proportioning valve (hereinafter referred to as "P valve") 40 and a normally-open second solenoid-operated shut-off valve 42 in series connection with each other. The P valve 40 is a pressure reducing valve which has a predetermined operating characteristic for controlling the fluid pressure in the rear wheel brake cylinder 26 with respect to the fluid pressure in the front wheel brake cylinder 22, according to a predetermined front-rear distribution line as indicated at A in FIG. 2. Described more specifically, the output pressure of the P valve 40 is held equal to the input pressure until the input pressure increases to a predetermined level with an increase in the master cylinder 10. After the input pressure reaches the predetermined level (bent point of the front-rear distribution line A), the output pressure is lowered with respect to the input pressure at a predetermined reduction ratio. The P valve 40 is disposed between the master cylinder 10 and the second shut-off valve 42, which is disposed between the P valve 40 and the rear wheel brake cylinder 26. To the rear brake cylinder passage 24, there is also connected a by-pass passage 44 which by-passes the second shut-off valve 42. The by-pass passage 44 incorporates a check valve 46 which has the same function as the check valve 34 described above.

The P valve 40 has a housing 50, which has a stepped cylinder bore 56 with a large-diameter portion 52 and a small-diameter portion 58. A stepped valve piston 62 having a large-diameter portion 58 and a small diameter portion 60 is slidably received in the stepped cylinder bore 56. The valve piston 62 is biased by biasing means in the form of a spring 64 so that the piston 62 is normally held in a non-operated position in which the end face of the large-diameter portion 58 abuts on the bottom wall of the small-diameter portion 54 of the housing 50. Between the cylinder bore 56 and the valve piston 62, there is disposed a sealing member in the form of a cup seal 66. This cup seal 66 divides the space in the cylinder bore 56 into two sections. One of these two section which is on the side of the large-diameter portion 52 serves as an input chamber 70, while the other section on the side of the small-diameter portion 54 serves as an output chamber 72. The input chamber 70 is connected to the master cylinder 10 through the first shut-off valve 30 and is held in communication with the front wheel brake cylinder 22, while the output chamber 72 is connected the rear wheel brake cylinder 26 through the second shut-off valve 42 and is held in communication with the output side of a pump 88 which will be described.

The cup seal 66 consists of a one-way sealing portion 74 and a two-way sealing portion 78. The one-way sealing portion 74 inhibits a flow of the fluid in the direction from the input chamber 70 toward the output chamber 72 while the portion 74 is in fluid-tight contact with the circumferential surface of the large-diameter portion 52 of the cylinder bore 56. The one-way sealing portion 74 permits a flow of the fluid in the direction from the output chamber 72 toward the input chamber 70 while the portion 74 is spaced apart from the surface of the large-diameter portion 52. When the valve piston 62 is moved from the non-operated position of FIG. 1 to an operated position (in the right direction as seen in the figure), the shoulder surface between the large-diameter and small-diameter portions 58, 60 of the piston 62 is brought into abutting contact with the two-way sealing portion 78, thereby inhibiting flows of the fluid in the opposite directions between the input and output chambers 70, 72. When the valve piston 62 is placed in the non-operated position of FIG. 1, the two-way sealing portion 78 is unseated off the shoulder surface of the piston 62, whereby the fluid is permitted to flow between the input and output chambers 70, 72.

The cup seal 66 has an annular protrusion formed on each of the opposite surfaces which define the input and output chambers 70, 72. The annular protrusions have a semi-circular cross sectional shape as seen in FIG. 1. The annular protrusion on the side of the input chamber 70 prevents the cup seal 66 from contacting the valve piston 62 at the entire area of the surface on the side of the input chamber 70, while the annular lip on the side of the output chamber 72 prevents the cup seal 66 from contacting the shoulder surface between the large-diameter and small-diameter portions 52, 54 of the cylinder bore 56, at the entire area of the surface on the side of the output chamber 72.

In the present embodiment, the one-way sealing portion 74 is formed as a lip portion of the cup seal 66 which is entirely formed of an elastic material, while the two-way sealing portion 78 is formed as an elastic valve seat. However, the one-way sealing portion may be constituted by a non-elastic one-way check valve, and the two-way sealing portion may be a metallic valve seat.

Although the present P valve 40 has the constant operating characteristics that define the predetermined distribution of the braking force on the front and rear wheels, the operating characteristic of the P valve 40 may be varied to change the front-rear distribution of the braking force in response to the detected load on the vehicle.

To a portion of the rear brake cylinder passage 24 between the second shut-off valve 42 and the rear wheel brake cylinder 26, there is connected a reservoir passage 80, which in turn is connected to a reservoir 82. The reservoir 82 has a housing 83 in which a piston 84 is fluid-tightly and slidably received. The piston 84 cooperates with the housing 82 to define a reservoir chamber for storing a mass of the brake fluid under a relatively low pressure produced by biasing means in the form of a spring 85 which acts on the piston 84. The pressure of the fluid in the reservoir chamber facilitates a supply of the fluid from the reservoir 82 to the pump 88.

In the reservoir passage 80, there is disposed a normally-closed third solenoid-operated shut-off valve 86. To the reservoir passage 82, there is connected a pump passage 87 which in turn is connected to a portion of the rear brake cylinder passage 24 between the P valve 40 and the second shut-off valve 42. To the pump passage 87, there is connected the pump 88, which is of a plunger type. The pump 88 is driven by a motor 90 in an intermittent manner, so that the fluid supplied from the reservoir 82 is pressurized and returned to the above-identified portion (pressure portion) of the rear brake cylinder passage 24 which is downstream of the P valve 40 and upstream of the second shut-off valve 42.

Each of the first, second and third shut-off valves 30, 42, 86 described above has a solenoid connected to a controller 100. The controller 100 includes a computer, an A/D converter and drivers for energizing the solenoids of the valves 30, 42, 86 and the motor 90. The computer incorporates a central processing unit (CPU), a read-only memory (ROM), a random-access memory (RAM) and a data bus. The controller 100 receives signals from speed sensors 102, 104 for detecting the rotating speeds of the front and rear wheels, respectively, and control the solenoids of the shut-off valves 30, 42, 86 so as to open and close these valves in response to the signals from the speed sensors 102, 104.

The controller 100 also controls the motor 90 for operating the pump 88. The motor 90 is continuously operated until the reservoir 82 is entirely evacuated by the pump 88. In other words, the motor 90 is turned off when the reservoir 82 is evacuated. This arrangement is effective to minimize the operating noise of the motor 90. However, the motor 90 may be kept operated as long as the pressures in the wheel brake cylinders are controlled in the anti-lock manner.

The evacuation of the reservoir 82 may be detected directly by a position sensor (e.g., proximity switch) adapted to detect the axial position of the piston 84 of the reservoir 82, or indirectly by a load sensor adapted to detect a load acting on the motor 90 on the basis of a current applied to the motor 90, or by a timer adapted to measure the time of continuous operation of the motor 90. Where the evacuation is indirectly detected, the motor 90 is turned off when the detected load is lowered below a predetermined threshold value or when the measured operation time exceeds a predetermined limit.

It is noted that the controller 100 may be adapted to turn off the motor 90 and stop the pump 88 even before the reservoir 82 is entirely evacuated, when it is required to discharge the brake fluid from the front and rear wheel brake cylinders 22, 26 for rapidly lowering the pressures in both of these brake cylinders 22, 26.

There will next be described in detail an operation of the controller 100 for controlling the shut-off valves 30, 42, 86.

While the motor vehicle is braked with the brake pedal 14 depressed, the controller 100 monitors the rotating conditions (e.g., deceleration values, slip amounts and slip ratios) of the individual wheels of the vehicle on the basis of the signals from the speed sensors 102, 104, and determine whether any wheels have a locking tendency. The controller 100 controls the shut-off valves 30, 42, 86 in a selected one of seven pressure control modes as indicated in TABLE 1 given above, to control the four wheel brake cylinders. These seven pressure control modes are established by respective different combinations of the open and closed states of the three shut-off valves 30, 42, 86. To this end, the controller 100 performs the following steps: (a) determining whether any one of the front and rear wheels of the two pressure application sub-systems has a locking tendency, and if it is determined that any wheel has a locking tendency, determining on the basis of the rotating condition of that wheel a pressure control command (selected from among a pressure reducing command, a pressure holding command and a pressure increasing command) which should be generated to control the braking pressure in the brake cylinder of the wheel in question; (b) then selecting one of the seven pressure control modes depending upon the determined pressure control command (pressure reducing, holding or increasing command) and depending upon whether the wheel having the locking tendency is a front or rear wheel; and (c) then controlling the pressure in the brake cylinder of the wheel in question in the selected pressure control mode. To this end, the ROM of the controller 100 stores routines for determining the pressure control commands for the individual wheels on the basis of the rotating conditions of the wheels, and routines for controlling (turning on or off) the solenoids of the respective shut-off valves 30, 42, 86 according to the determined pressure control commands.

The anti-lock pressure control operation of the present braking system will be described in detail, assuming that the P valve 40 is in a pressure-reducing state in which the pressures in the rear wheel brake cylinder 26 is lower than that in the front wheel brake cylinder 22 when any wheel has a locking tendency. In this respect, it is noted that the wheels are generally likely to have a locking tendency after the P valve 40 is brought to the pressure-reducing state (after the front and rear brake cylinder pressures exceed the levels represented by the bent point of the front-rear distribution line A shown in FIG. 2 by way of example).

If the front wheel associated with one of the two pressure application sub-system has a locking tendency without the rear wheel having a locking tendency, the anti-lock pressure control operation is performed in the following manner.

In this case, the pressure in the front wheel brake cylinder 22 should be reduced. However, the seven pressure control modes available do not include a mode for reducing only the pressure in the front wheel brake cylinder 22, as is apparent from TABLE 1. Therefore, the seventh pressure control mode is selected to reduce the pressures in both of the front and rear wheel brake cylinders 22, 26.

In the seventh pressure control mode, the solenoid of the first shut-off valve 30 is turned ON to close this shut-off valve 30, so that the front and rear wheel brake cylinders 22, 26 are disconnected from the master cylinder 10. Further, the solenoid of the third shut-off valve 86 is turned ON to open this shut-off valve 86, so that the pressures in the front and rear wheel brake cylinders 22, 26 are reduced. Described more specifically, the front wheel brake cylinder 22 is brought into communication with the reservoir 82 through the P valve 40, normally-open second shut-off valve 42 and now opened third shut-off valve 86, whereby the fluid is permitted to flow from the front wheel brake cylinder 22 to the reservoir 82. At the same time, the rear wheel brake cylinder 26 is communicated with the reservoir 82, and the fluid is permitted to flow from the cylinder 26 to the reservoir 82.

However, the fluid does not flow from the front wheel brake cylinder 22 to the reservoir 82 immediately after the seventh pressure control mode of operation is commenced. That is, the valve piston 62 of the P valve 40 is first moved in the left direction as seen in FIG. 1, with a decrease in the pressure in the output chamber 72, so that the large-diameter portion 58 is spaced apart from the two-way sealing portion 78 of the cup seal 66. As a result, the fluid from the front wheel brake cylinder 22 is permitted to flow toward the reservoir 82 through the P valve 40.

In the anti-lock pressure control operation, the motor 90 has been started when the flow of the fluid into the reservoir 82 is commenced. Therefore, the fluid which has flown into the reservoir 82 in the seventh pressure control mode is pumped up by the pump 88, and returned to the front wheel brake cylinder 22 through the P valve now placed in the non-operated position, and also to the rear wheel brake cylinder 26 through the second shut-off valve 42. However, since the effect of pressure reduction in the brake cylinders 22, 26 by the fluid flow into the reservoir 82 is larger than the effect of pressure increase in the cylinders 22, 26 by the return flows of the fluid by the pump 88, the pressures in these cylinders 22, 26 are eventually lowered. If it is desired to rapidly reduce the pressures in the cylinders 22, 26, the pump 88 may be held off when the seventh pressure control mode is established.

The seventh pressure control mode of operation is terminated when the locking tendency of the front wheel is eliminated or considerably reduced as a result of the reduction in the wheel brake cylinders 22, 26. Then, the pressures in the front and rear wheel brake cylinders 22, 26 are controlled in a selected one of the fourth through seventh pressure control modes, so as to eliminate or reduce the locking tendency of the front or rear wheel if it takes place.

In the fourth pressure control mode, the first and third shut-off valves 30, 86 are both closed, while the second shut-off valve 42 is opened, so that the fluid delivered from the pump 88 is returned to the front wheel brake cylinder 22 through the P valve 40, and to the rear wheel brake cylinder 26 through the now opened second shut-off valve 42, whereby the pressures in the front and rear wheel brake cylinders 22, 26 are both increased.

Figure 2:
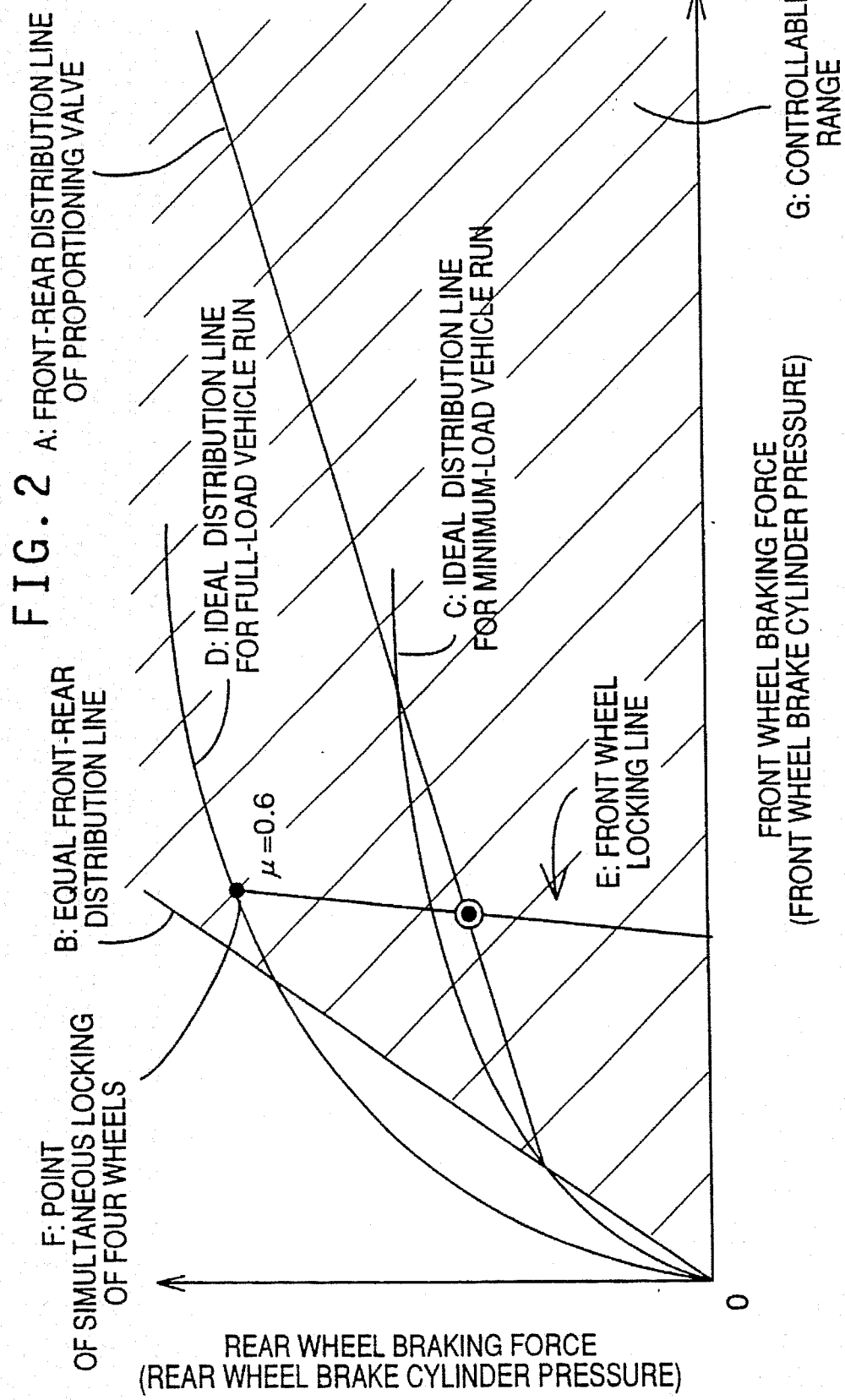
FIG. 2 is a graph for explaining a relationship between front and rear wheel braking forces.

In the fourth pressure control mode, the pressure in the rear wheel brake cylinder 26 is increased without an influence of the P valve 40. If the output end of the pump passage 87 was connected to a portion of the braking system which is upstream of the P valve 40, for example, the P valve 40 would have an influence on the pressure in the rear wheel brake cylinder 26 when this pressure is increased by operation of the pump 88. In this event, therefore, the pressure in the rear wheel brake cylinder 26 cannot exceed the level as determined by the front-rear distribution line A set on the P valve 40. Usually, the front-rear distribution line A of the P valve 40 is determined for assuring ideal distribution of the braking force on the front and rear wheels during a minimum-load run of the vehicle with only the driver (without any other passengers), so that the front wheel is more likely to lock than the rear wheel. Namely, the P valve 40 operates substantially following a front-rear distribution line C (also shown in FIG. 2) representing an ideal front-rear distribution of the braking force during the minimum-load vehicle run, even when the vehicle is in fact in a full-load run with the nominal number of passengers. FIG. 2 also shows a front-rear distribution line D which represents an ideal front-rear distribution of the braking force during the full-load vehicle run. The ideal front-rear distribution line D indicates that the rear wheel will not lock even if the pressure in the rear wheel brake cylinder 26 is raised to the level represented by the line D, when the vehicle is in the full-load run. However, the rear brake cylinder pressure could not be raised to that level during the full-load vehicle run if the output or delivery end of the pump 88 is located upstream of the P valve 40.

In view of this drawback indicated just above, the present embodiment is adapted such that the output end of the pump 88 is located downstream of the P valve 40, so as to permit an increase of the pressure in the rear wheel brake cylinder 26 without an influence of the P valve 40, so that the pressure in the rear wheel brake cylinder 26 can be increased to a level sufficiently close to the level (front-rear distribution line D) at which the rear wheel begins to lock on the road surface. Thus, the present arrangement permits maximum utilization of the friction coefficient of the road surface by the rear wheel to effectively brake the vehicle with a reduced braking distance required.

It is also noted that the pressure in the front wheel brake cylinder 22 is not increased immediately after the fourth mode of operation is commenced, since the P valve 40 is in the pressure-reducing state in an initial period of the pressure control operation with the front brake cylinder pressure exceeding the level at the bent point of the front-rear distribution line of the P valve 40. In this pressure-reducing state, only the pressure in the rear wheel brake cylinder 22 is increased while the pressure in the front wheel brake cylinder 26 is held constant, until the pressure in the output chamber 72 (output pressure=pressure in the front wheel brake cylinder 22) has increased to the pressure in the input chamber 70 (input pressure=pressure in the rear wheel brake cylinder 26). The pressure in the front wheel brake cylinder 22 begins to increase only after the pressure in the output chamber 72 has reached the pressure in the input chamber 70. The principle of this operation will be described in detail.

Referring to the graph of FIG. 3, there is shown a relationship between the pressures in the front and rear wheel brake cylinders 22, 26, that is, a relationship between the input pressure and output pressure in the P valve 40. Assuming that the present pressure in the front wheel brake cylinder 22 is represented by point Y on the front-rear distribution line of the P valve 40, this pressure is higher than the level represented by bent point X of the distribution line of the P valve 40. If the pressure in the rear wheel brake cylinder 26 is increased when the pressure in the front wheel brake cylinder 22 is at the level represented by the point Y, the force by which the spring 64 is compressed by the valve piston 62 of the P valve 40 is increased, and the valve piston 62 is consequently advanced in fluid-tight contact with the two-way sealing portion 78 of the cup seal 66 with an increased contact pressure, until the front end face (right end face as seen in FIG. 1) of the piston 62 abuts on the bottom wall of a plug 106 fixed to the housing 50. Accordingly, reduction in the volume of the input chamber 70 is inhibited, and the pressure in the front wheel brake cylinder 22 is held constant while the pressure in the rear wheel brake cylinder 22 is increased from the level represented by the point Y to the level represented by point Z, as indicated by a substantially vertical line connecting the points Y and Z. Since the point Z lies on an equal front-rear distribution line, the pressure in the rear wheel brake cylinder pressure 26 is eventually increased to the level of the pressure in the front wheel brake cylinder 22. When the pressure in the rear wheel brake cylinder 26 becomes subsequently higher by a small amount than that in the front wheel brake cylinder 22, the one-way sealing portion 74 of the cup seal 66 is opened, allowing a flow of the fluid from the output chamber 72 into the input chamber 70, and the pressure in the front wheel brake cylinder 22 is increased with that in the rear wheel brake cylinder 26, along the equal front-rear distribution line as indicated in FIG. 3.

In the fifth pressure control mode, the three shut-off valves 30, 42, 86 are all closed, and the pressure in the front wheel brake cylinder 22 is increased by operation of the pump 88 as in the fourth mode, while the pressure in the rear wheel brake cylinder 26 is held constant.

In the fifth pressure control mode, the fluid delivered from the pump 88 is not returned to the rear wheel brake cylinder 26, that is, returned to only the front wheel brake cylinder 22. In the fourth pressure control mode, on the other hand, the fluid from the pump 88 is also returned to the rear wheel brake cylinder 26. Accordingly, the rate of increase in the pressure in the front wheel brake cylinder 22 is higher in the fifth mode than in the fourth mode, as indicated in FIG. 4. As also shown in this figure, the pressure in the rear wheel brake cylinder 26 is increased in the fourth mode while the pressure in the same cylinder is held constant in the fifth mode.

In the sixth pressure control mode, the first and second shut-off valves 30, 42 are both closed while the third shut-off valve 86 is opened, whereby the pressure in the front wheel brake cylinder 22 is increased as in the fourth mode, while the pressure in the rear wheel brake cylinder 26 is reduced.

In principle, the first, second and third pressure control modes are not used for the anti-lock control of the wheel brake cylinder pressures. In these three modes, the first shut-off valve 30 is opened. During the anti-lock pressure control, it is desirable to disconnect the front and rear wheel brake cylinders 22, 26 from the master cylinder 10, in order to reduce the delivery pressure of the pump 88 and minimize the pressure pulsation of the fluid delivered from the pump 88. However, if it becomes necessary to increase the pressure in the front or rear wheel brake cylinder 22, 26 after the reservoir 82 is entirely evacuated with the entire mass of the fluid pumped up by the pump 88, an appropriate one of the first, second and third pressure control modes is established to increase the pressure in the wheel brake cylinder in question with the pressure generated by the master cylinder 10.

When the pressures in the front and rear wheel brake cylinders 22, 26 are increased by operation of the pump 88 in the fourth or fifth pressure control mode, the check valve 34 functions as a pressure relief valve to prevent the brake cylinder pressures from exceeding the pressure in the master cylinder 10.

While the operation of the braking system upon occurrence of a locking tendency of the front wheel without a locking tendency of the rear wheel has been described above, there will be described an operation upon occurrence of a locking tendency of the rear wheel without a locking tendency of the front wheel.

In this case, it is necessary to reduce the pressure in the rear wheel brake cylinder 26. To this end, the braking system is first placed in the third pressure control mode wherein the first and third shut-off valves 30, 86 are opened while the second shut-off valve 42 is closed, whereby substantially no anti-lock pressure control is effected with respect to the pressure in the front wheel brake cylinder 22. This is, the pressure in the front wheel brake cylinder 22 is increased with the pressure in the master cylinder 10, while the pressure in the rear wheel brake cylinder 26 is reduced through the now opened third shut-off valve 86.

In the above case, too, the pressurized fluid is delivered from the pump 88 and supplied to the P valve 40. At this time, however, the pressure in the front wheel brake cylinder 22 is equal to that in the master cylinder 10, and the delivery pressure of the pump 88 is generally lower than the master cylinder pressure. Therefore, the fluid delivered from the pump 88 will not flow into the input chamber 70 of the P valve through the one-way sealing portion 74.

Subsequently, the first through seventh pressure control modes are selectively established as needed. While the front wheel does not have a locking tendency, the first, second and third pressure control modes are selectively established, and only the pressure in the rear wheel brake cylinder is controlled in the anti-lock manner. If the front wheel as well as the rear wheel has a locking tendency, or if only the front wheel has a locking tendency with the locking tendency of the rear wheel being eliminated, the front and rear wheel brake cylinder pressures or the front wheel brake cylinder pressure is/are controlled in the anti-lock manner as in the case where the front wheel has a locking tendency without a locking tendency of the rear wheel cylinder.

The rear wheel has a locking tendency without a locking tendency of the front wheel when the front wheel lies on an area of an uneven friction-coefficient road surface which area has a relatively high friction coefficient, while the rear wheel lies on an area of the road surface having a relatively low friction coefficient. In this case, it is preferable to maximize the front wheel brake cylinder pressure as much while preventing locking of the front wheel, so that the relatively high friction coefficient of the road surface area is utilized by the front wheel to reduce the braking distance of the vehicle. On the other hand, it is preferable to maximize the cornering force acting on the rear wheel, for improving the steering or directional stability of the vehicle. In other words, it is desired that the braking system be capable of increasing the front wheel brake cylinder pressure without increasing the rear wheel brake cylinder pressure, or capable of reducing the rear wheel brake cylinder pressure without increasing the front wheel brake cylinder pressure. In the present embodiment, the fifth or sixth mode is established to increase the front wheel brake cylinder pressure without an increase in the rear wheel brake cylinder pressure, and the sixth mode is established to reduce the rear wheel brake cylinder pressure without a decrease in the front wheel brake cylinder pressure. Thus, the present embodiment assures not only reduction in the required braking distance of the vehicle but also an improvement of the steering stability of the vehicle in the case of braking of the vehicle while the front wheel is on the high friction-coefficient area of an uneven friction-coefficient road surface while the rear wheel is on the low friction-coefficient area.

Referring next to FIGS. 5–8, there will be described another embodiment of the present invention. The present embodiment is different from the first embodiment only in the manner in which the second shut-off valve 42 is controlled.

In the fourth pressure control mode, the pressure in the front wheel brake cylinder 22 is relatively slowly increased while that in the rear wheel brake cylinder is relatively rapidly increased, as indicated in FIG. 4. In this fourth mode, the rear wheel brake cylinder pressure is increased by operation of the pump 88. In this respect, the pump 88 does not deliver the pressurized fluid continuously but delivers the pressurized fluid intermittently, as indicated in the upper part of FIG. 8. Therefore, if the second shut-off valve 42 is held open in the fourth pressure control mode for a period longer than the delivery period of the pump 88, the entire amount of the fluid delivered by each delivery action of the pump 88 is supplied to the rear wheel brake cylinder 26. On the other hand, the diameter of the rear wheel brake cylinder 26 is usually smaller than that of the front wheel brake cylinder 22. Accordingly, when the same amount of the fluid is supplied to the front and rear wheel brake cylinders 22, 26, the pressure in the rear wheel brake cylinder 26 is more sensitively increased. Therefore, a continuous control of the brake cylinder pressures in the fourth mode with the second shut-off valve 42 held open will result in an excessively rapid increase in the rear wheel brake cylinder 26, leading to undesirable reduction in the control stability of the rear wheel brake cylinder pressure due to overshoot of the pressure rise.

In the light of the above drawback, the braking system according to the present embodiment has a duty-cycle pressure control mode in which the second shut-off valve 42 is alternately turned on and off with a controlled duty cycle while the first and third shut-off valves 30, 86 are held closed. This duty-cycle pressure control mode is considered to be a compromise between the fourth mode (for slow increase of the front wheel brake cylinder pressure and rapid increase of the rear wheel brake cylinder pressure) and the fifth mode (for rapid increase of the front wheel brake cylinder pressure and hold of the rear wheel brake cylinder pressure).

The duty cycle of the solenoid of the second shut-off valve 42 in the duty-cycle pressure control mode is not a fixed value but is variable for continuous change of the increase rates of the front and rear wheel brake cylinder pressures.

In the duty-cycle pressure control mode, the tendency toward increasing the rear wheel brake cylinder pressure is increased if the characteristic of the fourth pressure control mode is higher than that of the fifth pressure control mode, while the tendency toward increasing the front wheel brake cylinder pressure is increased if the characteristic of the fifth mode is higher than that of the fourth mode. Therefore, the duty-cycle pressure control mode wherein the duty cycle of the second shut-off valve 42 can be continuously controlled facilitates anti-lock pressure control of the brake cylinder pressures with high stability without an excessively high rate of increase in the rear wheel brake cylinder pressure, and adequate control of distribution of the front and rear wheel brake cylinder pressures, namely, adequate control of distribution of the braking force on the front and rear wheels.

Figure 5:
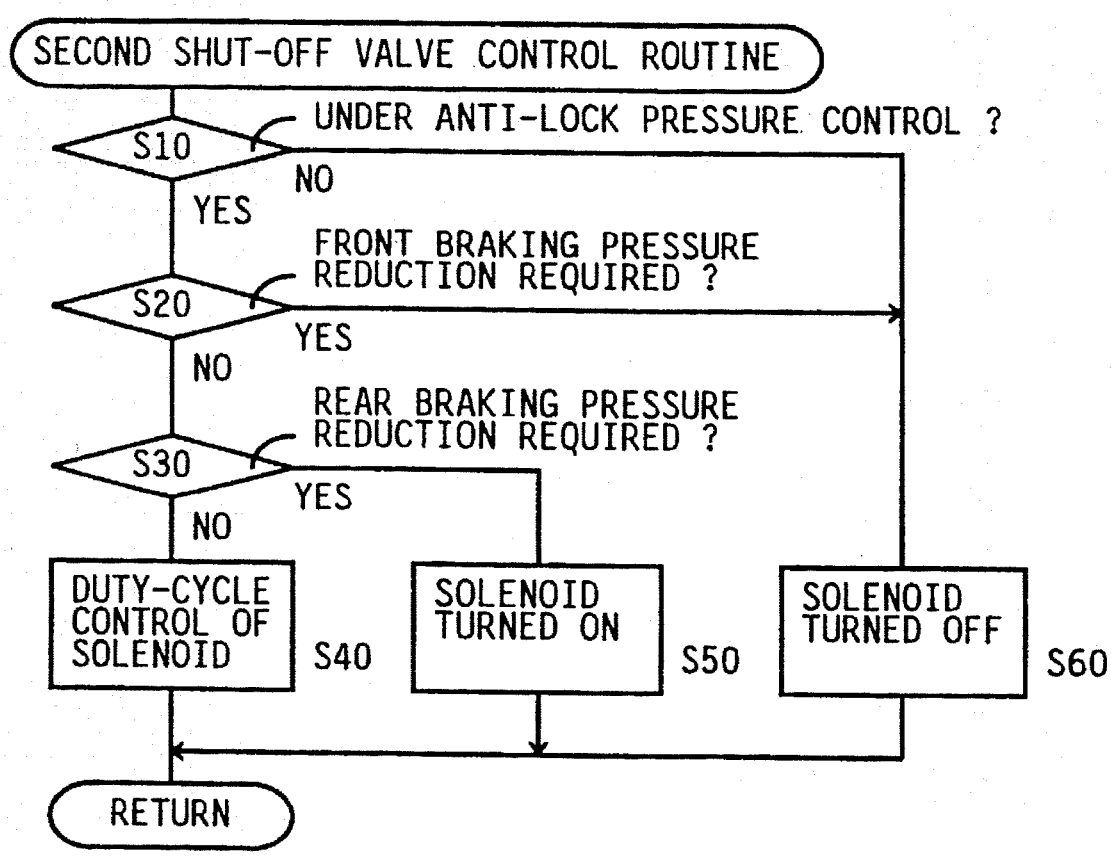
FIG. 5 is a flow chart illustrating a routine executed by a computer of a controller used in the braking system, for controlling a second shut-off valve provided in the system.
Figure 6:
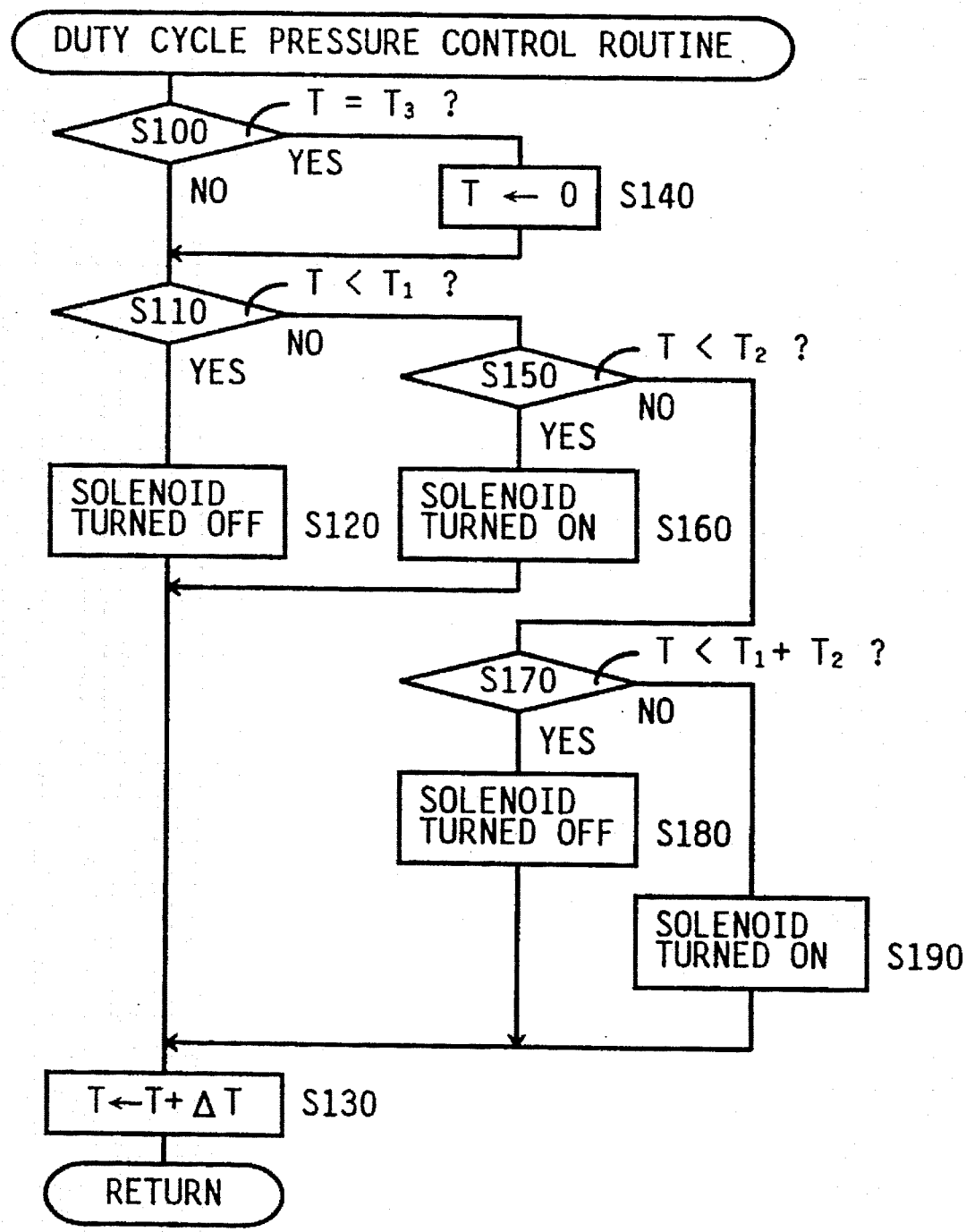
FIG. 6 is a flow chart illustrating a sub-routine executed in step S40 of the routine of FIG. 5.
Figure 7:
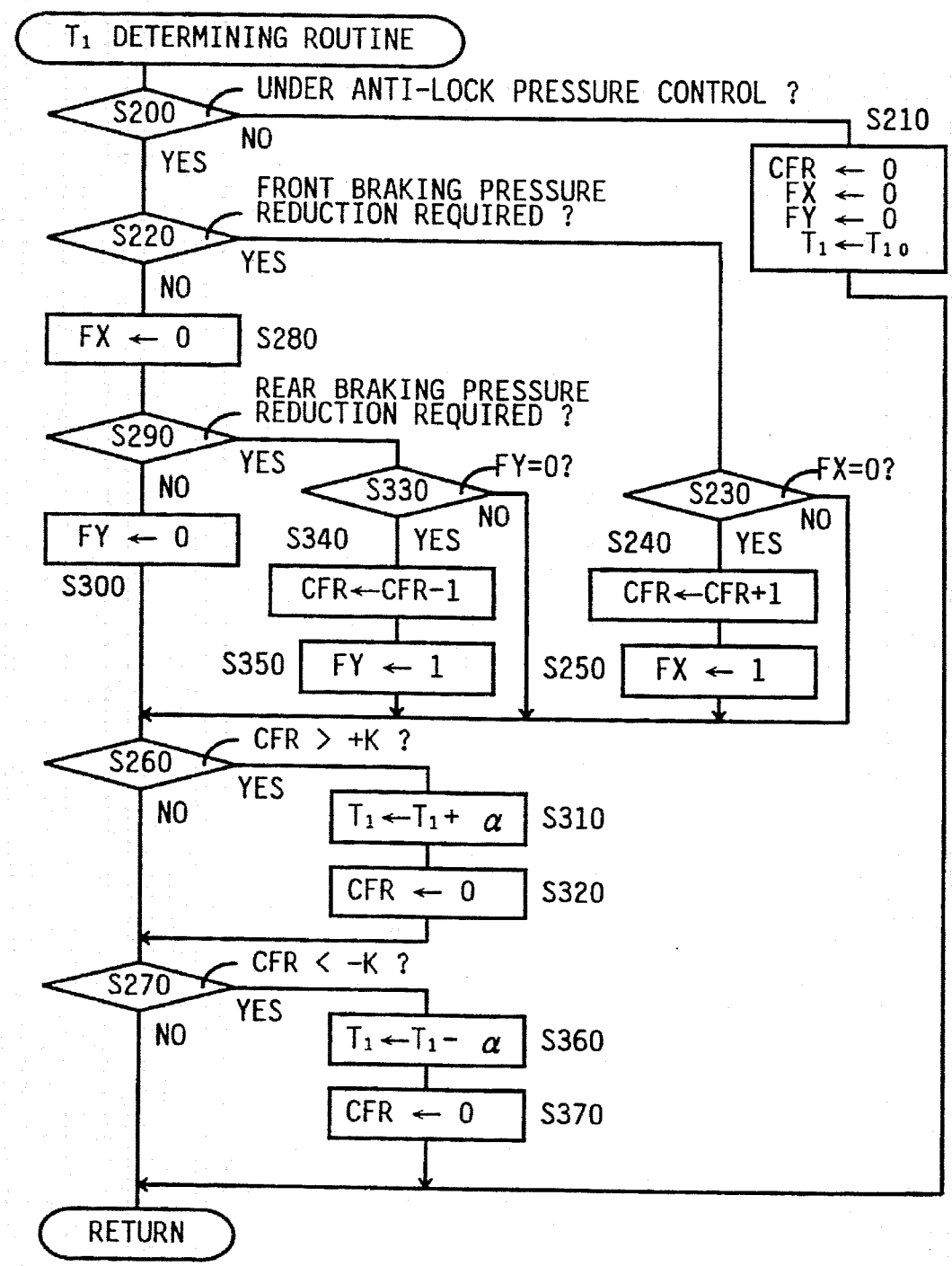
FIG. 7 is a flow chart illustrating a routine executed by the computer for determining an OFF time $T_1$ of the solenoid of the second shut-off valve.

In the present second embodiment, the ROM of the controller 100 stores routines for controlling the second shut-off valve 42, as illustrated in the flow charts of FIGS. 5-7. FIG. 5 illustrates the routine for controlling the solenoid of the second shut-off valve 42, and FIG. 6 illustrates a sub-routine executed in step S40 of the routine of FIG. 5, while FIG. 7 illustrates the routine for determining an OFF time $T_1$ of the solenoid.

These routines will be first briefly explained.

Figure 8A:
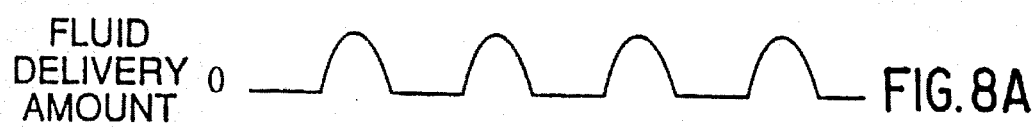
FIG. 8 is a graph for explaining a relationship between the intermittent fluid delivery of a pump used in the braking system and the energization and de-energization of the solenoid of the second shut-off valve.
Figure 8B:
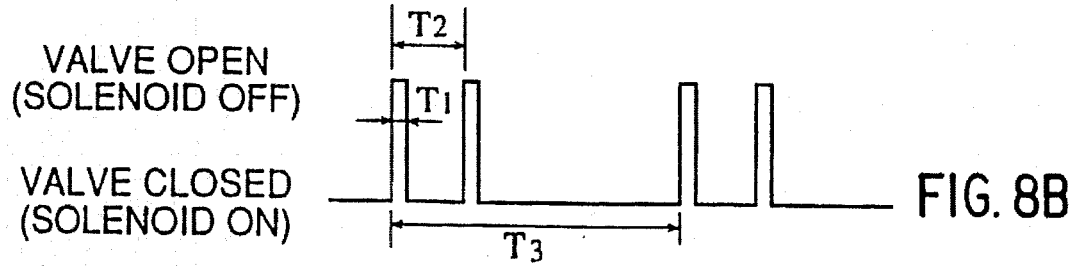

For assuring an increase in the pressure in the rear wheel brake cylinder 26 by operation of the pump 88, it is necessary to open the second shut-off valve 42 just when the pressurized fluid is delivered from the pump 88 and supplied to the rear wheel brake cylinder 26. In the present embodiment, the second shut-off valve 42 is open while its solenoid is held de-energized or OFF, namely, while the de-energization pulse is present. However, it is difficult to generate the de-energization pulses in synchronization of the intermittent delivery actions of the pump 88, respectively. The pump 88 has an operation cycle time consisting of the delivery time and the non-delivery time, which are substantially the same. The present embodiment is further adapted such that pairs of adjacent de-energization pulses are generated with a cycle time $T_3$, as indicated in the lower part of FIG. 8. Each de-energization pulse has the width corresponding to the OFF time $T_1$ of the solenoid of the second shut-off valve 42 during which the valve 42 is held open. The two adjacent de-energization pulses have an interval $T_2$ which includes the solenoid OFF time $T_1$, as also indicated in FIG. 8. This pulse interval $T_2$ is made equal to the delivery time of the pump 88, which is one half of the operation cycle time of the pump 88. According to this arrangement, the solenoid OFF time $T_1$ (open time of the shut-off valve 42) produced by one of the two de-energization pulses of each pair is usually held within the delivery time of the corresponding delivery time of the pump 88, even when the generation of the pair of de-energization pulses is not precisely timed with the delivery action of the pump 88 in its intermittent delivery operation. In the example shown in FIG. 8, the entirety of the OFF time $T_1$ of the former de-energization pulse occurs within the corresponding delivery time of the pump 88. However, the OFF times $T_1$ of the two de-energization pulses may partially overlap the corresponding delivery times of the pump 88. In this case, too, the total time during which the second shut-off valve 42 is open by the two pulses is equal to $T_1$.

Although it is possible that the de-energization pulse is generated for each delivery action or time of the pump 88, this arrangement is not desirable since the solenoid of the second shut-off valve 42 should be turned off and on for each delivery action of the pump 88, and the valve 42 should have a high response to the generation of the de-energization pulses. Further, this arrangement tends to cause a rapid increase in the rear wheel brake cylinder pressure. In view of these facts, the present embodiment is adapted such that pairs of de-energization pulses are generated with the cycle time $T_3$ which is two times the operation cycle time of the pump 88. That is, each pair of de-energization pulses is generated each time the pump 88 performs two adjacent delivery actions. Accordingly, during the cycle time $T_3$, the pressurized fluid delivered from the pump 88 is supplied to the front wheel brake cylinder 22 for a time period $T_3-2T_1$, and is supplied to the rear wheel brake cylinder 26 for a time period $T_1$. Therefore, the ratio of the amounts of the fluid supplied from the pump 88 to the front and rear wheel brake cylinders 22, 26 is proportional to $(T_3-2T_1)/T_1$.

As the ratio $(T_3-2T_1)/T_1$ increases, the rate of increase in the front wheel brake cylinder pressure increases while the rate of increase in the rear wheel brake cylinder pressure decreases, whereby the braking force acting on the front wheel increases while the braking force acting on the rear wheel decreases. Thus, there exists a relationship between the ratio of the amounts of the fluid supply from the pump 88 to the front and rear wheel brake cylinders 22, 26, and the ratio of the brake cylinder pressures or braking forces of the front and rear wheels. Namely, the ratios of the front and rear wheel brake cylinder pressures and braking forces increase with an increase in the ratio of the amounts of the fluid supply from the pump 88 to the front and rear wheel brake cylinders.

Accordingly, the ratio of the braking forces of the front and rear wheels can be changed by changing the ratio of the amounts of fluid supply from the pump 88 to the front and rear wheel brake cylinders 22, 26. The latter ratio can be changed by changing at least one of the solenoid OFF time $T_1$ (open time) of the second shut-off valve 42 and the cycle time $T_3$ at which the successive pairs of de-energization pulses are generated. If the solenoid OFF time $T_1$ is increased, for example, the ratio of the amount of fluid supply to the front wheel brake cylinder 22 to that to the rear wheel brake cylinder 26 is reduced, and the ratio of the braking force of the front wheel to that of the rear wheel is accordingly reduced. If the solenoid OFF time $T_1$ is reduced, the ratio of the amount of fluid supply to the front wheel brake cylinder 22 to that to the rear wheel brake cylinder 26 is increased, and the ratio of the braking force of the front wheel to that of the rear wheel is accordingly increased. If the cycle time $T_3$ is increased, the ratio of the fluid supply amounts of the front and rear wheel brake cylinders 22, 26 is increased and the ratio of the braking forces of the front and rear wheels is accordingly increased. If the cycle time $T_3$ is reduced, the ratios of the fluid supply amounts of the front and rear wheel brake cylinders and the braking forces of the front and rear wheels are reduced.

In the present embodiment, only the solenoid OFF time $T_1$ of the second shut-off valve 42 is increased or reduced to continuously change the duty cycle of the shut-off valve 42, which is the ratio of the open time to the closed time of the shut-off valve 42.

In the present embodiment, the solenoid OFF time $T_1$ is determined on the basis of the numbers of reductions and increases of the front and rear wheel brake cylinder pressures. To this end, the controller 100 is provided with a pressure reduction counter CFR which is incremented when the front wheel brake cylinder pressure is reduced once, and decremented when the rear wheel brake cylinder pressure is reduced once. The content of this pressure reduction counter CFR indicates a relationship between the pressure reduction frequencies of the front and rear wheel brake cylinders. The solenoid OFF time $T_1$ (width of each de-energization pulse) is increased by a predetermined constant value α each time the content of the counter CFR exceeds a positive threshold value +K, and decreased by the value α each time the content of the counter CFR becomes smaller than a negative threshold valve −K. The OFF time $T_1$ is variable within a range between 0 and $T_3$.

If the reduction of the front wheel brake cylinder pressure has occurred relatively frequently (if the front wheel brake cylinder has exhibited a relatively high tendency of pressure reduction), the content of the CFR exceeds the positive threshold valve +K, and the OFF time or open time $T_1$ of the second shut-off valve 42 is increased, whereby the amount of the fluid supply from the pump 88 to the front wheel brake cylinder 22 is reduced to reduce the rate of increase in the front wheel brake cylinder pressure for thereby reducing the braking force acting on the front wheel. On the other hand, the amount of the fluid supply from the pump 88 to the rear wheel brake cylinder 26 is increased to increase the rate of increase in the rear wheel brake cylinder pressure for thereby increasing the braking force acting on the rear wheel. In this case, therefore, the braking function of the front wheel is reduced while that of the rear wheel is increased.

If the reduction of the rear wheel brake cylinder pressure has occurred relatively frequently, the content of the CFR becomes smaller than the negative threshold value −K, and the OFF time or open time $T_1$ of the second shut-off valve 42 is reduced, whereby the amount of the fluid supply from the pump 88 to the front wheel brake cylinder 22 is increased to increase the rate of increase in the front wheel brake cylinder pressure for thereby increasing the braking force acting on the front wheel. On the other hand, the fluid supply from the pump 88 to the rear wheel brake cylinder 26 is inhibited to hold the rear wheel brake cylinder pressure at the present level for thereby maintaining the braking force presently acting on the rear wheel. In this case, therefore, the braking function of the front wheel is increased while an increase in the braking function of the rear wheel is inhibited.

It will be understood that the present embodiment is adapted such that the duty cycle of the solenoid of the second shut-off valve 42 is changed on the basis of at least one of the pressure reducing tendencies (pressure reducing hystereses) of the front and rear wheel brake cylinders 22, 26, by changing the solenoid off time $T_1$ (width of the de-energization pulse of the second shut-off valve 42) on the basis of the content of the pressure reducing counter CFR.

Referring to the flow charts of FIGS. 5 and 6, there will next be described in detail the routine for controlling the second shut-off valve 42. In this routine, the second shut-off valve 42 is controlled not only in the duty-cycle mode but also in the other pressure control modes, as explained below.

The present routine of FIG. 5 for controlling the second shut-off valve 42 is executed at a predetermined time interval. The routine is initiated with step S10 to determine whether the braking system is in the process of the anti-lock pressure control. This determination is effected on the basis of flags provided in the RAM of the controller 100. If a negative decision (NO) is obtained in step S10, the control flow goes to step S60 in which a signal is generated to de-energize or turn OFF the solenoid of the second shut-off valve 42, to hold the valve 42 in the open sate. Thus, one cycle of the present routine is terminated.

If the anti-lock pressure control of the braking system is commenced during repetitive execution of the routine, an affirmative decision (YES) is obtained in step S10, and the control flow goes to step S20 to determine whether it is required to reduce the front wheel brake cylinder pressure. This determination is made on the basis of a flag provided in the RAM. If an affirmative decision (YES) is obtained in step S20, the control flow goes to step S60 to turn OFF the solenoid of the second shut-off valve 42 for opening the valve 42. To reduce the front wheel brake cylinder pressure, the second shut-off valve 42 should be opened in the seventh pressure control mode as described above. In this seventh mode, the pressures in both of the front and rear wheel brake cylinders 22, 26 are reduced.

If a negative decision (NO) is obtained in step S20, the control flow goes to step S30 to determine whether it is required to reduce the rear wheel brake cylinder pressure. This step S30 is provided to determine whether the pressure reduction is required for only the rear wheel brake cylinder 26. If an affirmative decision (YES) is obtained in step S30, the control flow goes to step S50 to energize or turn ON the solenoid the shut-off valve 42 for closing the valve 42. In this case, only the rear wheel brake cylinder pressure is reduced regardless of the front wheel brake cylinder pressure.

If no pressure reduction is required for not only the front wheel brake cylinder 22 but also the rear wheel brake cylinder 26, a negative decision (NO) is obtained in step S30, and step S40 is implemented to control the second shut-off valve 42 in the duty-cycle mode. In the preceding embodiment, the fourth or fifth pressure control mode is selected in this situation. In the present embodiment, the duty-cycle pressure control mode is selected rather than the fourth or fifth mode.

Theoretically, the duty-cycle pressure control mode of operation is also performed in the first or second pressure control mode indicated in TABLE 1. In practice, however, the first and second modes are rarely selected during the anti-lock pressure control operation. In this sense, the duty-cycle pressure control mode is used as an alternative to the fourth or fifth mode.

The sub-routine for controlling the second shut-off valve 42 in the duty-cycle pressure control mode is illustrated in detail in the flow chart of FIG. 6. In this sub-routine, step S100 is initially implemented to: read out the cycle time $T_3$ (predetermined constant) from the ROM of the controller 100; read out from the RAM of the controller 100 a time lapse T from the start of the present cycle in which a pair of de-energization pulses each defining the solenoid OFF time $T_1$ is generated; and determine whether the time lapse T has reached the predetermined cycle time T3. Namely, step S100 is provided to determine whether the predetermined cycle time $T_3$ has passed. If a negative decision (NO) is obtained in step S100, step S110 is implemented to: read out the presently effective solenoid OFF time $T_1$ from the RAM; and determine whether the time lapse T is shorter than the solenoid OFF time $T_1$. The solenoid OFF time $T_1$ is determined by a routine illustrated in the flow chart of FIG. 7 as described below, and stored in the RAM. If an affirmative decision (YES) is obtained in step S110, the control flow goes to step S120 to turn off the solenoid of the shut-off valve 42 for opening the valve 42. Namely, the first one of the pair of de-energization pulses in question is generated. Then, step S130 is implemented to increment the time lapse T by a predetermined value ΔT. Thus, one cycle of execution of the sub-routine of FIG. 6 is terminated, and the control flow goes back to the main routine of FIG. 5.

The sub-routine of FIG. 6 is executed each time step S40 of the main routine of FIG. 5 is executed. The following description refers to the situation where step S40 of the main routine or the sub-routine of FIG. 6 is repeatedly implemented without implementation of steps S50 and S60.

When the time lapse T has reached the solenoid OFF time $T_1$ as a result of repeated execution of the sub-routine of FIG. 6, an affirmative decision (YES) is obtained in step S110, and the control flow goes to step S150 to read out the predetermined pulse interval $T_2$ from the ROM of the controller 100, and determine whether the time lapse T is shorter than the pulse interval $T_2$. If an affirmative decision (YES) is obtained in step S150, the control flow goes to step S160 in which the solenoid of the valve 42 is turned ON to close the valve 42. That is, the first de-energization pulse is terminated and replaced by an energization pulse which energizes or turn ON the solenoid. Then, step S160 is followed by step S130.

If the time lapse T has reached the pulse interval $T_2$ during the repeated execution of the sub-routine of FIG. 6, a negative decision (NO) is obtained in step S150, and the control flow goes to step S170 to determine whether the time lapse T is shorter than a sum of the solenoid OFF time $T_1$ and the pulse interval $T_2$. If an affirmative decision (YES) is obtained in step S170, step S180 is implemented to turn OFF the solenoid of the shut-off valve 42 to open the valve 42. Namely, the second one of the pair of de-energization pulses in question is generated. Then, the control flow goes to step S130.

If the time lapse T has reached the sum of $(T_1+T_2)$ during the repeated execution of the sub-routine of FIG. 6, a negative decision (NO) is obtained in step S170, and the control flow goes to step S190 to turn ON the solenoid of the shut-off valve 42 to close the valve 42. Thus, the second de-energization pulse is terminated. Then, the control flow goes to step S130.

When the time lapse T increases to the predetermined cycle time $T_3$ as a result of the repeated execution of the sub-routine of FIG. 6, an affirmative decision (YES) is obtained in step S100, and step S140 is implemented to reset the time lapse T for starting the next cycle of generation of a pair of de-energization pulses.

With the sub-routine of FIG. 6 executed repeatedly, the second shut-off valve 42 is controlled (opened and closed) by successive pairs of de-energization pulses which are generated periodically with the cycle time $T_3$, such that the two de-energization pulses of each pair have the pulse interval $T_2$ and each pulse has a width corresponding to the solenoid OFF time $T_1$ of the second shut-off valve 42, as indicated in the lower part of FIG. 8.

The duty cycle of the second shut-off valve 42 is controlled by determining the solenoid OFF time $T_1$ according to the routine of FIG. 7, which will be described in detail.

The routine of FIG. 7 is executed at a predetermined interval. The routine is initiated with step S200 to determine whether the braking system is in the process of the anti-lock pressure control. If a negative decision (NO) is obtained in step S200, the control flow goes to step S210 to reset the content of the pressure reduction counter CFR and flags FX and FY to zero, and reset the solenoid OFF time $T_1$ to a predetermined initial value $T_{10}$. The content of the counter CFR, the values of the flags FX, FY and the OFF time $T_1$ are stored in the RAM of the controller 100. The functions of the flags FX and FY will be described. One cycle of execution of the routine of FIG. 7 is terminated with step S210.

If the anti-lock pressure control is commenced during repeated execution of the routine of FIG. 7, an affirmative decision (YES) is obtained in step S200, and the control flow goes to step S220 to determine whether it is required to reduce the front wheel brake cylinder pressure. If an affirmative decision (YES) is obtained in step S220, step S230 is implemented to determine whether the flag FX is set at "0". If an affirmative decision (YES) is obtained in step S230, the control flow goes to step S240 to increment the pressure reduction counter CFR, and then step S250 to set the flag FX to "1".

Step S250 is followed by step S260 to determine whether the content of the counter CFR is larger than the positive threshold value +K. If an affirmative decision (YES) is obtained in step S260, step S310 is implemented to increase the solenoid OFF time $T_1$ by a predetermined value α, and store the increased OFF time $T_1$ in the RAM. Step S310 is followed by step S320 to reset the pressure reduction counter CFR to zero.

Then, step S270 is implemented to determine whether the content of the counter CFR is smaller than the negative threshold vale −K. If a negative decision (NO) is obtained in step S270, the present cycle of execution of the routine of FIG. 7 is terminated.

If it is still required to reduce the front wheel brake cylinder pressure in the next cycle, an affirmative decision (YES) is obtained in step S220, and a negative decision (NO) is obtained in step S230 since the flag FX has been set at "1". Consequently, the control flow goes to step S260 while skipping steps S240 and S250. Thus, the flag FX is provided to increment the pressure reduction counter CFR only once during repeated execution of the present routine while the reduction of the front wheel brake cylinder pressure is continuously required. In other words, the flag FX functions to increment the counter CFR only once for generation of each command to reduce the front wheel brake cylinder pressure. If the reduction of the front wheel brake cylinder pressure is no more required, a negative decision (NO) is obtained in step S220, and the control flow goes to step S280 to reset the flag FX to zero. Then, step S290 and the following steps S300, S330, S340 and S350 are implemented for decrementing the counter CFR. Steps S290, S300, S330, S340 and S350 for the rear wheel brake cylinder are equivalent to steps S220, S280, S230, S240 and S250 for the front wheel brake cylinder.

Then, step S260 is implemented to determine whether the content of the counter CFR is larger than the positive threshold value +K. If a negative decision (NO) is obtained in step S260, step S270 is implemented to determine whether the content of the counter CFR is smaller than the negative threshold value −K. If a negative decision (NO) is obtained in step S270, the present cycle of execution of the routine of FIG. 7 is terminated. If an affirmative decision (YES) is obtained in step S270, the control flow goes to step S360 to read out the solenoid OFF time $T_1$ from the RAM of the controller 100, and reduce the solenoid OFF time $T_1$ by the predetermined value α. Step S360 is followed by step S370 in which the counter CFR is reset to zero, and one cycle of execution of the routine of FIG. 7 is terminated.

It will be understood that the portions of the controller 100 assigned to implement step S40 of the routine of FIG. 5 (namely, sub-routine of FIG. 6 for controlling the second shut-off valve 42 in the duty-cycle pressure control mode) and the routine of FIG. 7 for determining the solenoid OFF time $T_1$ function as means for changing the duty cycle of the shut-off valve 42 on the basis of the numbers of the pressure reductions which have been required for the wheel brake cylinders 22, 26.

Referring next to the flow chart of FIG. 9, there will be described a routine for determining the solenoid OFF time $T_1$ in another embodiment of this invention.

In the preceding embodiment of FIGS. 5–7, the solenoid OFF time $T_1$ is determined on the basis of the numbers of the required pressure reductions of the front and rear wheel brake cylinders 22, 26, which numbers are one example of a physical phenomenon that directly represents the locking tendencies of the front and rear wheels. In the present embodiment, the solenoid OFF time $T_1$ is determined by taking into account changes in the loads acting on the front and rear wheels. The wheel load changes are an example of a physical phenomenon that influences the locking tendencies of the front and rear wheels. When the loads acting on the wheels are relatively large, the wheels are less likely to lock on the road surface. The braking forces that can be produced by the wheels increase with the wheel loads. Therefore, the friction coefficient of the road surface can be more effectively utilized by the wheels to brake the vehicle and the required braking distance of the vehicle can be shortened, by increasing the brake cylinder pressure of each wheel with an increase in the load acting on the wheel.

When the vehicle is braked, the vehicle is decelerated in the running direction. As a result of the vehicle deceleration, the vehicle load is moved or shifted in the running direction. The vehicle load shift varies with the friction coefficient of the road surface and with the force by which the brake pedal 14 is operated by the vehicle driver. When the vehicle is running forward, the vehicle load is moved so as to increase the load acting on the front wheel and reduce the load acting on the rear wheel. With this fact taken into consideration, the present embodiment is adapted to detect the deceleration value Gx of the vehicle in the running direction as a parameter that represents the vehicle load in the running direction. Although the vehicle deceleration Gx can be detected by an exclusive sensor, it is obtained in the present embodiment by differentiating the vehicle speed which is estimated from the detected rotating speeds of the wheels. That is, a derivative of the estimated vehicle speed is used as representing the vehicle deceleration Gx.

In the present embodiment, the solenoid OFF time $T_1$ of the second shut-off valve 42 is reduced with an increase in the vehicle deceleration value Gx. According to this arrangement, when the vehicle deceleration value Gx is increased, the amount of the fluid supply from the pump 88 to the front wheel brake cylinder 22 is increased to increase the front wheel brake cylinder pressure while the amount of the fluid supply from the pump 88 to the rear wheel brake cylinder 26 is reduced to lower the rear wheel brake cylinder pressure. In the present embodiment, the solenoid OFF time $T_1$ is changed in three steps. When the deceleration value Gx is larger than an upper limit Gxup, the OFF time $T_1$ is set to a minimum value $\alpha_{min}$. When the deceleration value Gx is smaller than a lower limit Gxlo, the OFF time $T_1$ is set to a maximum value $\alpha_{max}$. When the deceleration value Gx is between the upper and lower limits Gxup and Gxlo, the OFF time $T_1$ is set to an intermediate value $\alpha_{mid}$.

The routine for determining the solenoid OFF time $T_1$ as described above is illustrated in the flow chart of FIG. 9.

This routine is executed at a predetermined interval. The routine is initiated with step S400 to determine whether the braking system is in the process of the anti-lock pressure control. If a negative decision (NO) is obtained in step S400, the control flow goes to step S430 to set the OFF time $T_1$ to the intermediate value $\alpha_{mid}$. The thus determined OFF time $T_1$ is stored in the RAM of the controller 100, and one cycle of execution of the routine of FIG. 9 is terminated.

Figure 9:
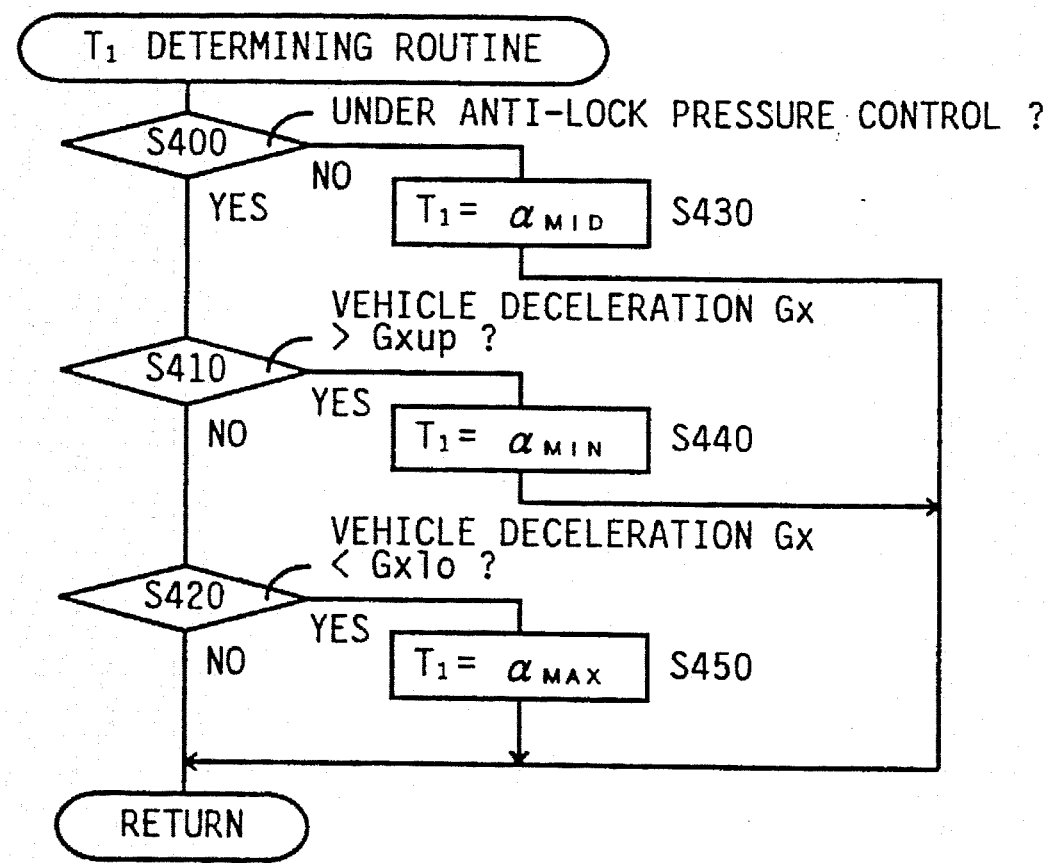
FIG. 9 is a flow chart illustrating a routine executed by the computer for determining the OFF time $T_1$ of the second shut-off valve, in another embodiment of the present invention.

If the anti-lock pressure control is commenced during repeated execution of the routine of FIG. 9, an affirmative decision (YES) is obtained in step S400, and step S410 is implemented to: read the present and last values of the estimated vehicle speed from the RAM; calculate the vehicle deceleration value Gx by subtracting the last estimated vehicle speed value from the present estimated vehicle speed value; and determine whether the calculated deceleration value Gx is larger than the upper limit Gxup. If a negative decision (NO) is obtained in step S410, the control flow goes to step S420 to determine whether the deceleration value Gx is smaller than the lower limit Gxlo. If a negative decision (NO) is obtained in step S420, one cycle of execution of the routine is terminated. In this case during the anti-lock pressure control, the intermediate value $\alpha_{mid}$ which was stored in the RAM prior to the anti-lock pressure control is used as the currently effective OFF time $T_1$.

If the vehicle deceleration value Gx exceeds the upper limit Gxup during repeated execution of the routine of FIG. 9 in the anti-lock pressure control operation, an affirmative decision (YES) is obtained in step S410, and the control flow goes to step S440 in which the minimum value $\alpha_{min}$ is set as the solenoid OFF time $T_1$. If the deceleration value Gx becomes lower than the lower limit Gxlo, a negative decision (NO) is obtained in step S410 while an affirmative decision (YES) is obtained in step S420, whereby step S450 is implemented to set the maximum value $\alpha_{max}$ as the OFF time $T_1$. Thus, one cycle of execution of the routine of FIG. 9 is terminated.

It will be understood that the portions of the controller 100 assigned to implement step S40 of the routine of FIG. 5 (namely, sub-routine of FIG. 6 for controlling the second shut-off valve 42 in the duty-cycle pressure control mode) and the routine of FIG. 9 for determining the solenoid OFF time $T_1$ function as means for changing the duty cycle of the shut-off valve 42 on the basis of the vehicle load shift in the running direction.

Referring to the flow chart of FIG. 10, there will be described a routine for determining the solenoid OFF time $T_1$ in a further embodiment of this invention.

In the preceding embodiment of FIG. 9, the solenoid OFF time $T_1$ is determined on the basis of the changes in the loads on the front and rear wheels due to the vehicle load shift in the running direction. In the present embodiment, the solenoid OFF time $T_1$ is determined by taking into account the changes in the loads acting on the front and rear wheels, which changes occur due to a vehicle load shift in the lateral direction.

When the vehicle is braked while it is turning, the vehicle under braking undergoes lateral acceleration, and the vehicle load is moved or shifted in the lateral direction. Since the present braking system is of the diagonal or X-crossing type, the lateral load shift on the vehicle causes an increase in the front wheel load and a decrease in the rear wheel load in the pressure application sub-system in which the front and rear wheels are located on the outer and inner sides of the vehicle turning line, respectively, and causes a decrease in the front wheel load and an increase in the rear wheel load vehicle in the pressure application sub-system in which the front and rear wheels are located on the inner and outer sides of the vehicle turning line, respectively. The present embodiment is adapted to determine the solenoid OFF time $T_1$ of the second shut-off valve 42 based on the changes in the loads acting on the front and rear wheels due to the vehicle load shift in the lateral direction. Although the present embodiment is adapted to take only the lateral wheel load changes into account in determining the OFF time $T_1$, the wheel load changes in the vehicle running direction and/or the numbers of the required pressure reductions of the front and rear wheel brake cylinders 22, 26 may also be taken into account in determining the OFF time $T_1$.

In the present embodiment, the lateral vehicle acceleration Gy is detected by an exclusive sensor, and the solenoid OFF time $T_1$ of the second shut-off valve 42 is controlled in only one of the pressure application sub-systems in which the front and rear wheels are located on the outer and inner sides of the vehicle turning line, respectively. When the lateral acceleration value Gy is relatively large, the OFF time $T_1$ is reduced to increase the amount of the fluid supply from the pump 88 to the front wheel brake cylinder 22 for thereby increasing the front wheel brake cylinder pressure, and reduce the amount of the fluid supply from the pump 88 to the rear wheel brake cylinder 26 for thereby reducing the rear wheel brake cylinder pressure.

In the present embodiment, the solenoid OFF time $T_1$ is changed in three steps. When the lateral acceleration value Gy is larger than an upper limit Gyup, the OFF time $T_1$ is set to a minimum value $\beta_{min}$. When the lateral acceleration value Gy is smaller than a lower limit Gylo, the OFF time $T_1$ is set to a maximum value $\beta_{max}$. When the deceleration value Gy is between the upper and lower limits Gyup and Gylo, the OFF time $T_1$ is set to an intermediate value $\beta_{mid}$.

In the pressure application sub-system in which the front and rear wheels are located on the inner and outer sides of the vehicle turning line, respectively, the rear wheel load increases with an increase in the vehicle lateral acceleration value Gy. However, the rear wheel load decreases due to the vehicle load shift in the running direction, and the amount of decrease of the rear wheel load due to the vehicle load shift in the running direction is generally larger than the amount of increase of the rear wheel load due to the vehicle lateral load shift. In view of this tendency, the solenoid OFF time $T_1$ is held constant in the pressure application sub-system in which the front and rear wheels are located on the inner and outer sides of the vehicle turning line, respectively.

Figure 10:
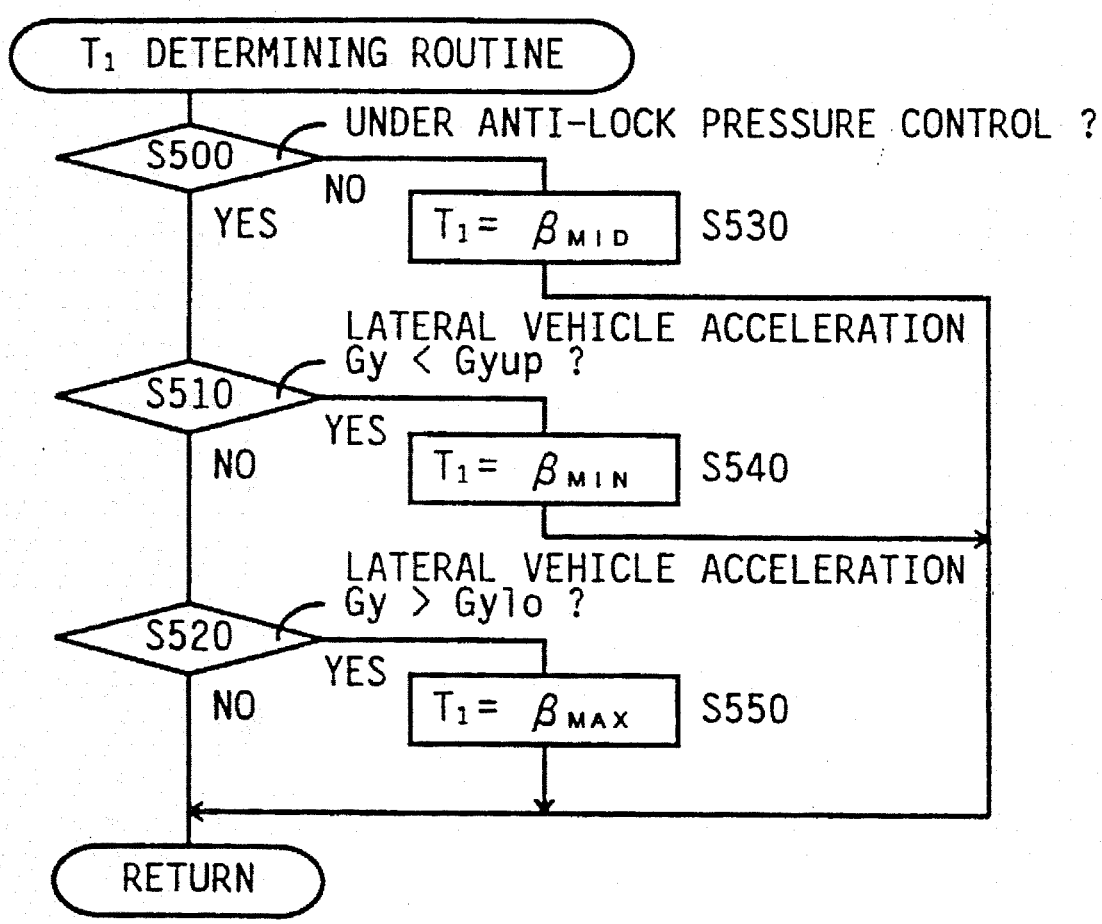
FIG. 10 is a flow chart illustrating a routine for determining the OFF time $T_1$ of the second shut-off valve in a further embodiment of the invention.
Figure 11:
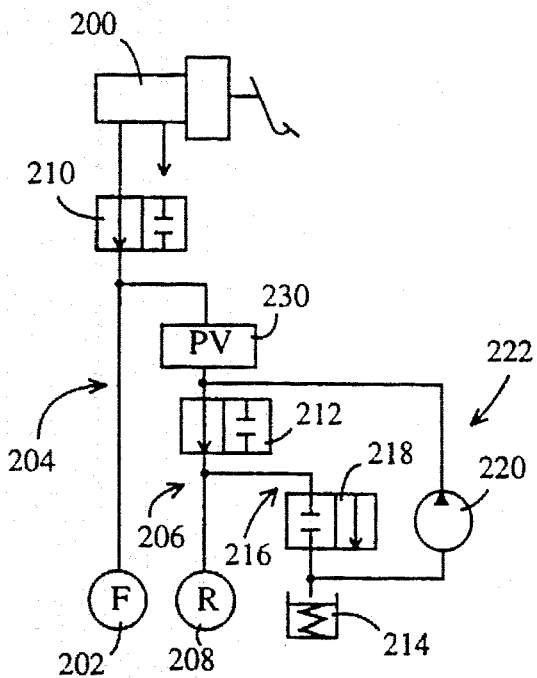
FIG. 11 is a hydraulic circuit diagram schematically showing one preferred form of this invention.
Figure 12:
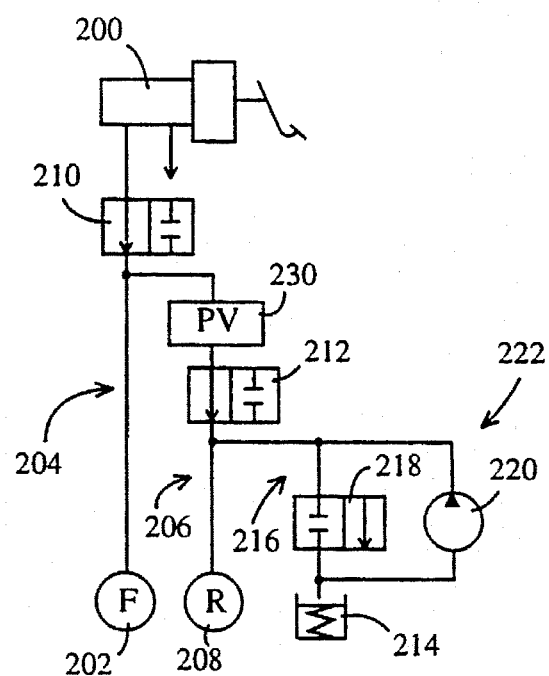
FIG. 12 is a hydraulic circuit diagram schematically showing another preferred form of the invention.
Figure 13:
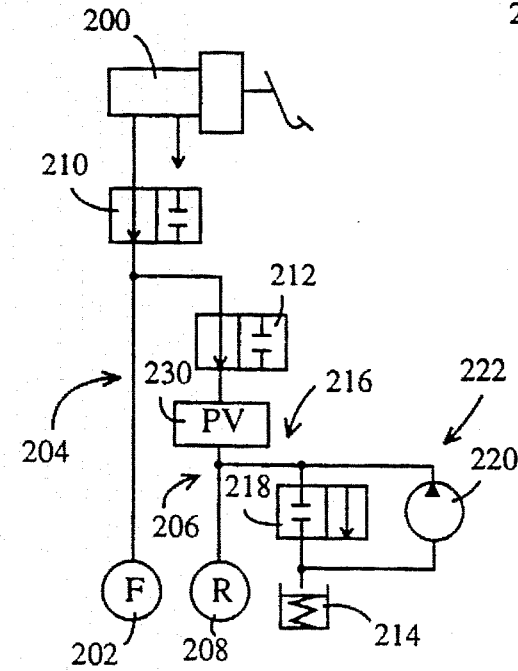
FIG. 13 is a hydraulic circuit diagram schematically showing a further preferred form of the invention.
Figure 14:
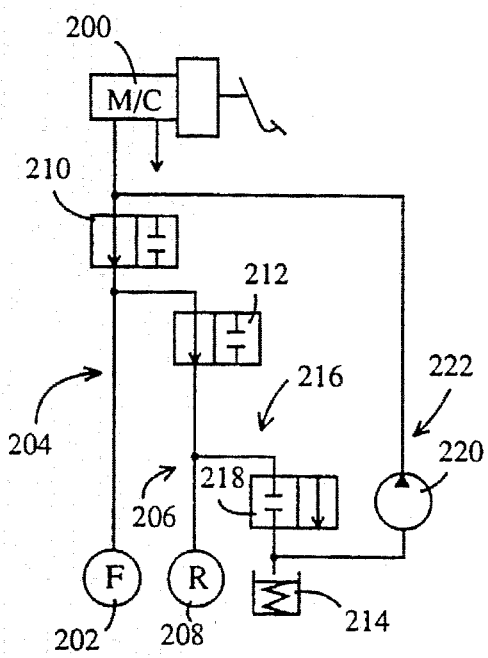
FIG. 14 is a hydraulic circuit diagram schematically showing one example of a known anti-lock braking system of so-called diagonal or X-crossing type.

The flow chart of FIG. 10 illustrates the routine for determining the solenoid OFF time $T_1$ of the shut-off valve 42 used in the pressure application sub-system in which the front and rear wheels are located on the outer and inner sides of the vehicle turning line, respectively.

The routine of FIG. 10 is executed at a predetermined interval. The routine is initiated with step S500 to determine whether the braking system is in the process of the anti-lock pressure control. If a negative decision (NO) is obtained in step S500, the control flow goes to step S530 to set the OFF time $T_1$ to the intermediate value $\beta_{mid}$. The thus determined OFF time $T_1$ is stored in the RAM of the controller 100, and one cycle of execution of the routine of FIG. 9 is terminated.

If the anti-lock pressure control is commenced during repeated execution of the routine of FIG. 10, an affirmative decision (YES) is obtained in step S500, and step S510 is implemented to: read the lateral acceleration value Gy as detected by the exclusive sensor; and determine whether the detected lateral acceleration value Gy is larger than the upper limit Gyup. If a negative decision (NO) is obtained in step S510, the control flow goes to step S520 to determine whether the lateral acceleration value Gy is smaller than the lower limit Gylo. If a negative decision (NO) is obtained in step S520, one cycle of execution of the routine is terminated. In this case during the anti-lock pressure control, the intermediate value $\beta_{mid}$ which was stored in the RAM prior to the anti-lock pressure control is used as the currently effective OFF time $T_1$.

If the vehicle lateral acceleration value Gy exceeds the upper limit Gyup during repeated execution of the routine of FIG. 10 in the anti-lock pressure control operation, an affirmative decision (YES) is obtained in step S510, and the control flow goes to step S540 in which the minimum value $\beta_{min}$ is set as the solenoid OFF time $T_1$. If the lateral acceleration value Gy becomes lower than the lower limit Gylo, a negative decision (NO) is obtained in step S510 while an affirmative decision (YES) is obtained in step S520, whereby step S550 is implemented to set the maximum value $\beta_{max}$ as the OFF time $T_1$. Thus, one cycle of execution of the routine of FIG. 10 is terminated.

It will be understood that the portions of the controller 10 assigned to implement step S40 of the routine of FIG. 5 (namely, sub-routine of FIG. 6 for controlling the second shut-off valve 42 in the duty-cycle pressure control mode) and the routine of FIG. 10 for determining the solenoid OFF time $T_1$ function as means for changing the duty cycle of the shut-off valve 42 on the basis of the vehicle load shift in the lateral direction perpendicular to the running direction.

Figure 15:
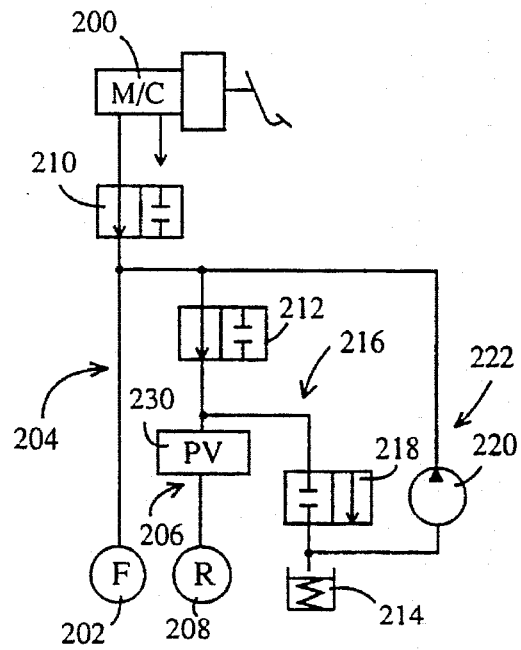
FIG. 15 is an improved form of the known braking system of FIG. 14 which was developed by the assignee of the present invention.
Figure 16:
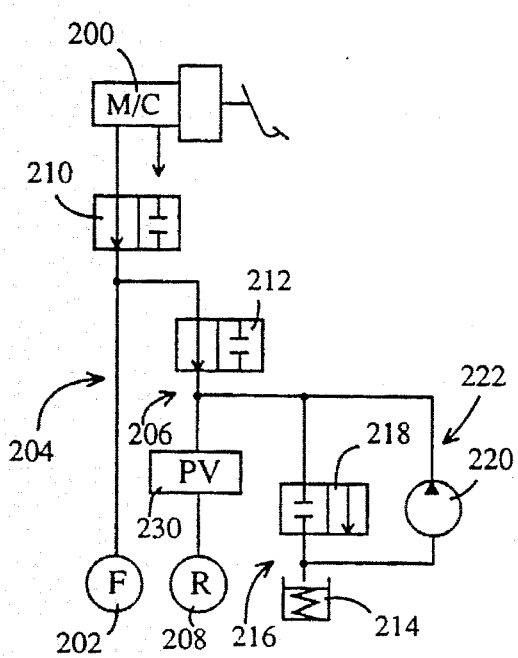
FIG. 16 is another improved form of the known braking system of FIG. 14 which was also developed by the assignee of the present invention.

It is noted that the location of the delivery or output end of the pump passage 87 downstream of the P valve 40 is not essential to control the second shut-off valve 42 in the duty-cycle pressure control mode, provided that the output end of the pump passage 87 is located downstream of the first shut-off valve 30 which is in principle held closed while the braking system is in the process of the anti-lock pressure control. Therefore, the second shut-off valve 42 can be controlled in the duty-cycle pressure control mode even in the braking systems as illustrated in FIGS. 15 and 16.

While the present invention has been described in detail in its presently preferred embodiments, it is to be understood that the invention is not limited to the details of the illustrated embodiments, but may be embodied with various changes, modifications and improvements, which may occur to those skilled in the art without departing from the spirit and scope of the invention defined in the following claims.

What is claimed is:

1. An anti-lock braking system of a diagonal or X-crossing type for a four-wheel motor vehicle, having two pressure application sub-systems which are connected to respective two mutually independent pressurizing chambers of a master cylinder, each of said two pressure application sub-system comprising:

(a) a front brake cylinder passage connecting a corresponding one of said two pressurizing chambers of said master cylinder and a front wheel brake cylinder;

(b) a rear brake cylinder passage connecting said front brake cylinder passage and a rear wheel brake cylinder;

(c) a normally-open, first solenoid-operated shut-off valve disposed in a portion of said front brake cylinder passage between said master cylinder and a point of connection of said front and rear brake cylinder passages;

(d) a series connection of a normally-open, second solenoid-operated shut-off valve and a proportioning valve disposed in said rear brake cylinder passage;

(e) a reservoir passage connected at one of opposite ends thereof to a portion of said rear brake cylinder passage between said second solenoid-operated shut-off valve and said rear wheel brake cylinder;

(f) a reservoir connected to the other end of said reservoir passage;

(g) a normally-closed, third solenoid-operated shut-off valve disposed in said reservoir passage;

(h) a pump passage connected at one of opposite ends thereof to said reservoir and at the other end to a portion of said rear brake cylinder passage between said proportioning valve and said rear wheel brake cylinder;

(i) a pump disposed in said pump passage for delivering a working fluid from said reservoir to a portion of said each pressure application sub-system; and (j) a controller for controlling said first, second and third solenoid-operated shut-off valves to effect an anti-lock pressure control operation for controlling pressures of said working fluid in said front and rear brake cylinders in an anti-lock manner.

2. An anti-lock braking system according to claim 1, wherein said proportioning valve is disposed in a portion of said rear brake cylinder passage between said point of connection of said front and rear brake cylinder passages and said second solenoid-operated shut-off valve, and said second solenoid-operated shut-off valve is disposed in a portion of said rear brake cylinder passage between said proportioning valve and said rear wheel brake cylinder, said other end of said pump passage being connected to a portion of said rear brake cylinder passage between said proportioning valve and said second solenoid-operated shut-off valve.

3. An anti-lock braking system according to claim 1, wherein said proportioning valve is disposed between a portion of said rear brake cylinder passage between said point of connection of said front and rear brake cylinder passages and said second solenoid-operated shut-off valve, and said second solenoid-operated shut-off valve is disposed in a portion of said rear brake cylinder passage between said proportioning valve and said rear wheel brake cylinder, said other end of said pump passage being connected to a portion of said rear brake cylinder passage between said second solenoid-operated shut-off valve and said rear wheel brake cylinder.

4. An anti-lock braking system according to claim 1, wherein said second solenoid-operated shut-off valve is disposed between a portion of said rear brake cylinder passage between said point of connection of said front and rear brake cylinder passages and said proportioning valve, and said proportioning valve is disposed in a portion of said rear brake cylinder passage between said second solenoid-operated shut-off valve and said rear wheel brake cylinder, said other end of said pump passage being connected to a portion of said rear brake cylinder passage between said proportioning valve and said rear wheel brake cylinder.

5. An anti-lock braking system of a diagonal or X-crossing type for a four-wheel motor vehicle, having two pressure application sub-systems which are connected to respective two mutually independent pressurizing chambers of a master cylinder, each of said two pressure application sub-system comprising:

(a) a front brake cylinder passage connecting a corresponding one of said two pressurizing chambers of said master cylinder and a front wheel brake cylinder;

(b) a rear brake cylinder passage connecting said front brake cylinder passage and a rear wheel brake cylinder;

(c) a normally-open, first solenoid-operated shut-off valve disposed in a portion of said front brake cylinder passage between said master cylinder and a point of connection of said front and rear brake cylinder passages;

(d) a series connection of a normally-open, second solenoid-operated shut-off valve and a proportioning valve disposed in said rear brake cylinder passage;

(e) a reservoir passage connected at one of opposite ends thereof to a portion of said rear brake cylinder passage between said second solenoid-operated shut-off valve and said rear wheel brake cylinder;

(f) a reservoir connected to the other end of said reservoir passage;

(g) a normally-closed, third solenoid-operated shut-off valve disposed in said reservoir passage;

(h) a pump passage connected at one of opposite ends thereof to said reservoir and at the other end to at least one of said rear brake cylinder passage and a portion of said front brake cylinder passage between said first solenoid-operated shut-off valve and said front wheel brake cylinder;

(i) a pump disposed in said pump passage for delivering a working fluid from said reservoir to a portion of said each pressure application sub-system; and (j) a controller for controlling said first, second and third solenoid-operated shut-off valves to effect an anti-lock pressure control operation for controlling pressures of said working fluid in said front and rear wheel brake cylinders in an anti-lock manner, said controller having a plurality of operation modes which are selectively established to control said first, second and third solenoid-operated shut-off valves in said anti-lock manner, said plurality of operation modes including:

(1) a mode in which said second and third solenoid-operated shut-off valves are both open while said first solenoid-operated shut-off valve is closed, to reduce the pressures in both of said front and rear wheel brake cylinders;

(2) a mode in which said first and second solenoid-operated shut-off valves are both closed while said third solenoid-operated shut-off valve is open, to increase the pressure in said front wheel brake cylinder by operation of said pump and reduce the pressure in said rear wheel brake cylinder; and (3) a duty-cycle pressure control mode in which said first and third solenoid-operated shut-off valves are both closed while said second solenoid-operated shut-off valve is alternately closed and opened.

6. An anti-lock braking system of a diagonal or X-crossing type for a four-wheel motor vehicle, having two pressure application sub-systems which are connected to respective two mutually independent pressurizing chambers of a master cylinder, each of said two pressure application sub-system comprising:

(a) a front brake cylinder passage connecting a corresponding one of said two pressurizing chambers of said master cylinder and a front wheel brake cylinder;

(b) a rear brake cylinder passage connecting said front brake cylinder passage and a rear wheel brake cylinder;

(c) a normally-open, first solenoid-operated shut-off valve disposed in a portion of said front brake cylinder passage between said master cylinder and a point of connection of said front and rear brake cylinder passages;

(d) a series connection of a normally-open, second solenoid-operated shut-off valve and a proportioning valve disposed in said rear brake cylinder passage;

(e) a reservoir passage connected at one of opposite ends thereof to a portion of said rear brake cylinder passage between said second solenoid-operated shut-off valve and said rear wheel brake cylinder;

(f) a reservoir connected to the other end of said reservoir passage;

(g) a normally-closed, third solenoid-operated shut-off valve disposed in said reservoir passage;

(h) a pump passage connected at one of opposite ends thereof to said reservoir and at the other end to at least one of said rear brake cylinder passage and a portion of said front brake cylinder passage between said first solenoid-operated shut-off valve and said front wheel brake cylinder (i) a pump disposed in said pump passage for delivering a working fluid from said reservoir to a portion of said each pressure application sub-system; and (j) a controller for controlling said first, second and third solenoid-operated shut-off valves to effect an anti-lock pressure control operation for controlling pressures of said working fluid in said front and rear wheel brake cylinders in an anti-lock manner, said controller comprising means for inhibiting an operation of said pump when it is required to reduce the pressure in said front wheel brake cylinder during said anti-lock pressure control operation.

7. An anti-lock braking system of a diagonal or X-crossing type for a four-wheel motor vehicle, having two pressure application sub-systems which are connected to respective two mutually independent pressurizing chambers of a master cylinder, each of said two pressure application sub-system comprising:

(a) a front brake cylinder passage connecting a corresponding one of said two pressurizing chambers of said master cylinder and a front wheel brake cylinder;

(b) a rear brake cylinder passage connecting said front brake cylinder passage and a rear wheel brake cylinder;

(c) a normally-open, first solenoid-operated shut-off valve disposed in a portion of said front brake cylinder passage between said master cylinder and a point of connection of said front and rear brake cylinder passages;

(d) a series connection of a normally-open, second solenoid-operated shut-off valve and a proportioning valve, wherein the proportioning valve is disposed in a portion of said rear brake cylinder passage between said point of connection of said front and rear brake cylinder passages and said second solenoid-operated shut-off valve, and wherein said second solenoid-operated shut-off valve is disposed in a portion of said rear brake cylinder passage between said proportioning valve and said rear wheel brake cylinder;

(e) a reservoir passage connected at one of opposite ends thereof to a portion of said rear brake cylinder passage between said second solenoid-operated shut-off valve and said rear wheel brake cylinder;

(f) a reservoir connected to the other end of said reservoir passage;

(g) a normally-closed, third solenoid-operated shut-off valve disposed in said reservoir passage;

(h) a pump passage connected at one of opposite ends thereof to said reservoir and at the other end to a portion of said rear brake cylinder passage between said proportioning valve and said second solenoid-operated shut-off valve;

(i) a pump disposed in said pump passage for delivering a working fluid from said reservoir to a portion of said each pressure application sub-system; and (j) a controller for controlling said first, second and third solenoid-operated shut-off valves to effect an anti-lock pressure control operation for controlling pressures of said working fluid in said front and rear brake cylinders in an anti-lock manner, wherein said controller has a plurality of operation modes which are selectively established to control said first, second and third solenoid-operated shut-off valves in said anti-lock manner, said plurality of operation modes including (1) a mode in which said second and third solenoid-operated shut-off valves are both open while said first solenoid-operated shut-off valve is closed, to reduce the pressures in both of said front and rear wheel brake cylinders;

(2) a mode in which said first and second solenoid-operated shut-off valves are both closed while said third solenoid-operated shut-off valve is open, to increase the pressure in said front wheel brake cylinder by operation of said pump and reduce the pressure in said rear wheel brake cylinder; and (3) a duty-cycle pressure control mode in which said first and third solenoid-operated shut-off valves are both closed while said second solenoid-operated shut-off valve is alternately closed and opened.

8. An anti-lock braking system according to claim 7, wherein said controller comprises means for inhibiting an operation of said pump when it is required to reduce the pressure in said front wheel brake cylinder during said anti-lock pressure control operation.

9. An anti-lock braking system according to claim 7, wherein said controller comprises means for changing a duty cycle of a solenoid of said second solenoid-operated shut-off valve in said duty-cycle pressure control mode.

10. An anti-lock braking system according to claim 9, wherein said means for changing said duty cycle comprises means for generating pulses for effecting one of energization and de-energization of the solenoid of said second solenoid-operated shut-off valve with a first predetermined cycle time ($T_3$).

11. An anti-lock braking system according to claim 9, wherein said pump is operated for intermittent delivery of the working fluid with a second predetermined cycle time which consists of a delivery time and a non-delivery time, and wherein said means for changing said duty cycle generates pulses for effecting one of energization and de-energization of said solenoid, said pulses having an interval ($T_2$) which is one half of said second predetermined cycle time of said pump.

12. An anti-lock braking system according to claim 11, wherein said means for changing said duty cycle generates successive pairs of pulses at said first predetermined cycle time ($T_3$), said first predetermined cycle time being more than two times said interval ($T_2$).

13. An anti-lock braking system according to claim 12, wherein said means for changing said duty cycle changes the width of each of the pulses of each of said successive pairs of pulses.

14. An anti-lock braking system according to claim 9, wherein said means for changing said duty cycle changes said duty cycle of the solenoid of said second solenoid-operated shut-off valve on the basis of at least one of pressure reducing tendency of said front wheel brake cylinder and pressure reducing tendency of said rear wheel brake cylinder, which tendencies have been exhibited in said anti-lock pressure control operation.

15. An anti-lock braking system according to claim 14, wherein said means for changing said duty cycle determines said duty cycle of the solenoid of said second solenoid-operated shut-off valve, so as to establish a distribution of the pressures of said front and rear wheel brake cylinders which causes a higher rate of increase in the pressure of said front wheel brake cylinder and a lower rate of increase in the rear wheel brake cylinder when said rear wheel brake cylinder has exhibited a higher tendency of pressure reduction than said front wheel brake cylinder.

16. An anti-lock braking system according to claim 15, wherein said means for changing said duty cycle comprises a pressure reduction counter which is incremented each time the pressure in said front wheel brake cylinder is reduced, and decremented each time the pressure in said rear wheel brake cylinder is reduced, said means for changing said duty cycle determining said duty cycle so that an open time during which said second solenoid-operated shut-off valve is open is shorter when a content (CFR) of said pressure reduction counter is larger than a positive threshold value (+K) than when said content is smaller than a negative threshold value (−K).

17. An anti-lock braking system according to claim 9, wherein said means for changing said duty cycle changes said duty cycle of the solenoid of said second solenoid-operated shut-off valve on the basis of an amount of shift of a load on said motor vehicle in a running direction of the vehicle.

18. An anti-lock braking system according to claim 17, wherein said means for changing said duty cycle determines said duty cycle of the solenoid of said second solenoid-operated shut-off valve, so as to establish a distribution of the pressures of said front and rear wheel brake cylinders which causes a higher rate of increase in the pressure of said front wheel brake cylinder and a lower rate of increase in the rear wheel brake cylinder when the amount of shift of said load to a front wheel for which said front wheel brake cylinder is provided is relatively large than when the amount of shift of said load to said front wheel is relatively small.

19. An anti-lock braking system according to claim 9, wherein said means for changing said duty cycle changes said duty cycle of the solenoid of said second solenoid-operated shut-off valve on the basis of an amount of shift of a load on said vehicle in a lateral direction of the vehicle.

20. An anti-lock braking system according to claim 19, wherein said means for changing said duty cycle determines said duty cycle of the solenoid of said second solenoid-operated shut-off valve, so as to establish a distribution of the pressures of said front and rear wheel brake cylinders which causes a higher rate of increase in the pressure in the front wheel brake cylinder and a lower rate of increase in the rear wheel brake cylinder when the amount of shift of the load is relatively large than when the amount of shift of said load is relatively small, in the pressure application subsystem in which front and rear wheels to be braked by said front and rear wheel brake cylinders are respectively located on an outer side and an inner side of a turning line along which said vehicle is turning.

* * * * *

UNITED STATES PATENT AND TRADEMARK OFFICE
CERTIFICATE OF CORRECTION

PATENT NO. : 5,538,334

DATED : July 23, 1996

INVENTOR(S) : Naoto KUSHI et al.

It is certified that error appears in the above-indentified patent and that said Letters Patent is hereby corrected as shown below:

| Column | Line | |
|---|---|---|
| 4 | 55 | After "to" insert --as--. |
| 4 | 57 | Change "force-on" to --force on--. |
| 5 | 32,40,43,46,51, 46, | Delete "optional". |
| 6 | 1 | Change "sub-system" to --sub-systems--. |
| 12 | 13 | Change "sub-system" to --sub-systems--. |
| 13 | 6 | Change "sub-system" to --sub-systems--; before "cylinder" delete ".". |
| 15 | 67 | After "connected" insert --to--. |
| 17 | 17 | Change "control" to --controls--. |
| 17 | 52 | Change "determine" to --determines--. |
| 18 | 27 | Change "sub-system" to --sub-systems--. |
| 21 | 46 | Change "This is," to --That is,--. |
| 23 | 48 | Change "of" to --with--. |

UNITED STATES PATENT AND TRADEMARK OFFICE
CERTIFICATE OF CORRECTION

PATENT NO. : 5,538,334
DATED : July 23, 1996
INVENTOR(S) : Naoto KUSHI et al.

It is certified that error appears in the above-indentified patent and that said Letters Patent is hereby corrected as shown below:

| Column | Line | |
|---|---|---|
| 22 | 11 | After "as much" insert --as possible--. |
| 24 | 8 | Before "open" insert --held--. |
| 24 | 46 | Change "supply from" to --supplied by--. |
| 26 | 12 | Change "sate" to --state--. |
| 26 | 35 | After "solenoid" insert --of--. |
| 27 | 30 | Change "turn" to --turns--. |
| 28 | 34 | Change "vale-K" to --value-K--. |
| 28 | 51 | Change "more" to --longer--. |
| 33 | 66 | Change "sub-system" to --sub-systems--. |
| 34 | 60 | Change "sub-system" to --sub-systems--. |
| 35 | 39 | Change "sub-system" to --sub-systems--. |

Signed and Sealed this

Third Day of December, 1996

Attest:

BRUCE LEHMAN

*Attesting Officer*  *Commissioner of Patents and Trademarks*